(12) United States Patent
Auschra et al.

(10) Patent No.: US 7,723,425 B2
(45) Date of Patent: *May 25, 2010

(54) PIGMENT COMPOSITIONS WITH MODIFIED ATRP COPOLYMER DISPERSANTS

(75) Inventors: Clemens Auschra, Freiburg (DE); Ernst Eckstein, Rheinfelden (DE); Marie-Odile Zink, Mulhouse (FR); Andreas Mühlebach, Frick (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 1100 days.

This patent is subject to a terminal disclaimer.

(21) Appl. No.: 11/387,020

(22) Filed: Mar. 21, 2006

(65) Prior Publication Data

US 2006/0160950 A1    Jul. 20, 2006

Related U.S. Application Data

(63) Continuation of application No. 10/495,519, filed as application No. PCT/EP02/13064 on Nov. 21, 2002, now abandoned.

(30) Foreign Application Priority Data

Nov. 29, 2001    (EP)    ................................. 01811158

(51) Int. Cl.
*C08L 53/00*    (2006.01)

(52) U.S. Cl. ........................ 524/505; 525/93; 525/94; 525/326.1; 525/328.2; 525/329.7; 525/330.3

(58) Field of Classification Search ................... 525/93, 525/94, 326.1, 328.2, 329.7, 330.3; 524/505
See application file for complete search history.

(56) References Cited

U.S. PATENT DOCUMENTS

| 4,656,226 | A | 4/1987 | Hutchins et al. ............... 525/93 |
| 5,859,113 | A | 1/1999 | McIntyre et al. ............ 524/460 |
| 6,376,597 | B1 * | 4/2002 | Coca et al. .................. 524/504 |
| 6,849,679 | B2 | 2/2005 | Auschra et al. ............. 524/438 |
| 2002/0123559 | A1 * | 9/2002 | White et al. ................ 524/543 |

FOREIGN PATENT DOCUMENTS

| EP | 0329873 | 8/1989 |
| EP | 1275689 | 1/2003 |
| WO | 96/30421 | 10/1996 |
| WO | 00/40630 | 7/2000 |
| WO | 01/51534 | 7/2001 |
| WO | 01/92359 | 12/2001 |

* cited by examiner

*Primary Examiner*—Jeffrey C Mullis
(74) *Attorney, Agent, or Firm*—Joseph C. Suhadolnik

(57) ABSTRACT

The present invention relates to a composition containing modified block copolymer dispersants and dispersible inorganic or organic pigments. The block copolymers are prepared by atom transfer radical polymerisation (ATRP) and modified with a salt forming group. The pigment composition is useful for preparing coating compositions, prints, images, inks or lacquers and other disperse systems.

11 Claims, No Drawings

PIGMENT COMPOSITIONS WITH MODIFIED ATRP COPOLYMER DISPERSANTS

This is a continuation of U.S. application Ser. No. 10/495,519, now abandoned, which is a 371 of PCT/EP02/13064, filed Nov. 21, 2002, which application is incorporated herein in its entirety by reference.

The present invention relates to a composition containing dispersible inorganic or organic pigment particles and modified ATRP block copolymer or comb type dispersants, a process for preparing the composition, a pigment dispersion containing dispersible inorganic or organic pigment particles and modified ATRP block- or comb-type copolymer dispersants, a process for preparing the pigment dispersion and to the use of the pigment dispersion for preparing coatings, images, lacquers and others.

Dispersions containing pigments and polymer additives are used in an almost unlimited number of different technical applications, e.g. as coating materials, for printing inks, colouring plastic materials, including fibres, glasses, or ceramic products, for formulations in cosmetics, or for the preparation of paint systems, in particular automotive, industrial and decorative paints.

The function of polymers in pigment dispersions is manifold. They may act as solubilisers in the given carrier liquid, e.g. water or organic solvents. Suitable polymers are also needed as stabilisers to prevent precipitation or flocculation. Polymers may also improve the gloss of the pigment dispersion or enhance its rheology. Depending on the type and polarity of the dispersing agent, e.g. water, organic solvents or mixtures thereof, polymers of variable structure are chosen. In view of ecological requirements, the use of aqueous pigment dispersions is particularly preferred, as well as dispersions based on organic solvents with high solids content. In aqueous systems, mixtures of hydrophobic and hydrophilic polymers or block copolymers, so-called A-B block copolymers, containing hydrophilic and hydrophobic polymer blocks can be used. The hydrophobic "A" blocks (homo- or copolymers of methacrylate monomers) associate with either pigment or emulsion polymer surfaces or both. With hydrophilic "B" blocks (neutralised acid or amine containing polymers), these copolymers are useful for preparing water based pigment dispersions, cf. H. J. Spinelli, *Progress in Organic Coatings* 27 (1996), 255-260.

Many different well-established methods are available for preparing the polymers used in pigment dispersions. Most methods have the disadvantage that uncontrollable recombination reactions of initiator radicals may occur immediately after their formation with the effect that variable ratios between initiator radicals and stable free radicals are produced. Consequently, in some cases there is an inefficient control of the polymerisation process.

Group transfer polymerisation (GTP) is a well-established method for producing A-B block copolymers of defined structure from methacrylate monomers. Despite its wide applicability and usefulness the GTP method still has several drawbacks. The polymerisation initiators used in this method, such as the silyl ketene acetals disclosed in U.S. Pat. No. 4,656,226, e.g. 1-trimethylsilyloxy-1-isobutoxy-2-methylpropene, are highly reactive and difficult to prepare in a multi-step synthesis. This necessitates the use of carefully dried and purified reactants, which limits this method in industrial applications operating on a large scale.

In view of the almost unlimited range of different technical applications, there remains a growing need for pigment dispersions of improved pigment affinity and rheology, as expressed by the viscosity of the mill base at a given shear rate and improved gloss of surface coatings.

WO 96/30421 discloses a controlled or "living" polymerisation process of ethylenically unsaturated polymers, such as styrene or (meth) acrylates, by employing the Atom Transfer Radical Polymerisation (ATRP) method. This method produces defined oligomeric homopolymers and copolymers, including block copolymers. Initiators are employed which generate radical atoms, such as ●Cl, in the presence of a redox system of transition metals of different oxidation states, e.g. Cu(I) and Cu(II), providing "living" or controlled radical polymerisation.

WO 00/40630 discloses pigment dispersions containing block copolymers as dispersants prepared by the ATRP method. The block copolymers consist of defined hydrophobic and hydrophilic polymer blocks. The difference in polarity is obtained by copolymerising polymer blocks A and B wherein different amounts of monomer units with hydrophilic functional groups are present, such as amino or alkylated amino groups. This changes the hydrophilic/hydrophobic character of the block copolymer dispersant. In one embodiment, the individual hydrophobic "A" blocks based on uncharged homo- or copolymers of methacrylate or acrylate monomers form steric stabiliser blocks in solvent based coating formulations. The presence of more hydrophilic "B" blocks (e.g. amino functional acrylates or methacrylates) is the basis for pigment affinity to certain organic or inorganic pigments. Various additives, such p-toluenesulphonic acid are also disclosed.

WO 01/51534 discloses comb polymer dispersants prepared via macromonomers made by ATRP. Certain additives like p-toluenesulphonic acid are disclosed.

It has surprisingly been found that the addition of specific salt forming compounds, such as specific monocyclic sulphonic acids or polycyclic sulphonic acids or mono- or polycyclic carboxylic and phosphonic acids, or alkyl halogenide containing monocyclic or polycyclic groups or esters of monocyclic or polycyclic sulphonic acids in the event that monomer units containing amino groups are present in one block of the co polymer, produces pigment dispersions having improved properties for the above-mentioned technical applications.

The present invention relates to a composition comprising a) 0.1-99.9% by weight dispersible inorganic or organic pigment particles; and b) 0.1-99.9% by weight dispersing agents that essentially consist of a combination of (i) a copolymer of the formula

$$\{X\text{-}[(A_x\text{-}B_y)]_p\text{—}Y\}_q \qquad (I),$$

wherein

X represents the fragment of a polymerisation initiator capable of initiating polymerisation of ethylenically unsaturated monomers by atom transfer radical polymerisation (ATRP) in the presence of a catalyst capable of activating controlled radical polymerisation by ATRP;

Y represents a polymer chain terminal group;

A and B represent polymer blocks composed of non-ionic repeating units of ethylenically unsaturated monomers; and wherein at least one of the polymer blocks A or B or the chain terminal group Y additionally contains repeating units of ethylenically unsaturated monomers substituted with basic residues;

one of x and y represents zero, one or a numeral greater than one and the other one represents a numeral greater than one; and wherein x and y defines a the number of monomer repeating units in the polymer blocks A and B;

one of p and q represents one and the other one represents one or a numeral greater than one; and wherein p defines the number of groups of the partial formula $$X\text{-}(A_x\text{-}B_y)_p\text{—} \quad (A),$$

attached to the polymer chain terminal group Y; and q defines the number of groups of the partial formula $$\text{—}(A_x\text{-}B_y)_q\text{—}Y \quad (B),$$

per initiator fragment X; and (ii) a salt forming compound selected from the group consisting of an organic acid, an alkyl halide group and a sulphonic acid ester, or, in the alternative, (i') a copolymer (I), wherein X, Y, A, B, x, y, p, and q are as defined above; and wherein at least one of the polymer blocks A or B or the chain terminal group Y additionally contains repeating units of ethylenically unsaturated monomers substituted with acidic residues; and (ii') a salt forming compound substituted with basic residues;

provided that p-toluenesulphonic acid is excluded as salt-forming compound (ii).

The present invention also relates to a pigment dispersion comprising a') dispersed pigment particles; and b') a combination of a copolymer (I) wherein X, A, B, Y, x, y, p and q are as defined above; and a salt forming compound (ii) or (ii') as defined above;

and a carrier liquid comprising water, organic solvents and mixtures thereof.

The pigment dispersions are useful for a large variety of technical applications, e.g. for the preparation of inks or printing inks in printing processes, such as flexographics, screen, packaging, security ink, intaglio or offset printing, for pre-press stages and textile printing, for office, home or graphic applications, for paper goods, pens, felt tips, fibres tips, card, wood, (wood) stains, metal, inking pads, or inks for impact printing, (with impact-pressure ink ribbons), or for the preparation of colorants, for coatings, e.g. paints, for textile decoration and industrial marking, for roller coatings or powder coatings or for automotive finishes for high-solids, for low-solvent, water containing or metallic coating materials or for water-containing formulations, water-containing paints, or for the preparation of pigmented plastics, fibres, platters or mold carriers, or for pigmented radiation curable coatings, or for pigmented gel coats, laminates, composites, adhesives and casting resins, or for non-impact printing material, for digital printing, thermal wax transfer printing, inkjet printing or thermal transfer printing, or for the preparation of colour filters, especially for visible light in the range from 400 to 700 nm, which can be used for the production of liquid crystal displays (LCD) or charge combined devices (CCD), for the preparation of cosmetics, toners, or polymeric ink particles for the preparation of toners, such as dry or liquid copy toners or electro photographic toners. The toners can be prepared in master batches and be used in turn in master batches for the preparation of coloured plastics.

The terms and definitions used in the specification of the present invention preferably have the following meanings:

Component a)

Suitable dispersible organic pigments are pigments or pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, and the like. Further examples of organic pigments can be found in the monograph: W. Herbst, K. Hunger "*Industrelle Organische Pigmente*"$2^{nd}$ *Edition*, 1995, *VCH Verlagsgesellschaft, ISBN:* 3-527-28744-2.

Suitable dispersible inorganic pigments are selected from the group consisting of metallic flakes, such aluminium, aluminium -oxide, calcium carbonate, silicon oxide and silicates, iron(III)oxide, chromium(III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV)molybdate, and mixtures, crystal forms or modifications thereof, such as rutil, anatas, mica, talcum or kaolin.

The composition may contain in addition to component a)—pigments— and component b)—dispersing agents— conventional binder materials for preparing coating compositions, e.g. paints, fillers, and other conventional additives, in particular conventional additives selected from the group consisting of surfactants, light stabilisers, UV-absorbers, anti-foaming agents, dyes, plasticisers, thixotropic agents, drying catalysts, anti-skinning agents and levelling agents. The composition may also contain conventional additives, such as antioxidants, flow control agents, rheology control agents such as fumed silica, micro gels, screeners, quenchers or absorbers. These additives can be added individually or in mixtures, with or without so-called sterically hindered amines (HALS).

The composition may contain the above-mentioned pigment component a) in an amount of 0.1 to 99.9% by weight, preferably 0.1 to 50.0% by weight, and particularly preferably 1.0 to 30.0% by weight.

Component b)

The term dispersing agent is defined within the limits of a so-called solid/liquid dispersion, as opposed to other types of dispersions, such as liquid/liquid (e.g. emulsions) or solid/gas (e.g. fumes) dispersions. Solid/liquid dispersions that apply here consist of a two-phase system containing insoluble solid particles or solid particles of low solubility within a liquid. The dispersing agent enables solid particles, in the instant case pigment particles, to be distributed homogeneously within a liquid phase, e.g. water or organic solvent, or mixtures of both, or a polymer melt. Homogeneous distribution means that the concentration of the solid particles within the liquid phase in any volume fraction of the liquid phase is identical or approximately identical (even distribution of the solid particles).

The term copolymer comprises block or comb copolymers obtainable by methods wherein at least one polymerisation step consists of ATRP.

The term block copolymer comprises random block, multi-block, star-block or gradient copolymers. The polymer blocks A and B consist of at least two repeating units of polymerisable ethylenically unsaturated monomers.

The term comb copolymer comprises comb type and graft copolymers prepared from macromonomers obtainable by methods wherein at least one polymerisation step consists of ATRP. The term macromonomer comprises homopolymers, random copolymers, AB-type block copolymers, gradient or tapered copolymers. Comb polymers are obtainable by copolymerisation of macromonomers with other monomers by any of the known polymerisation methods like conventional or controlled or "living" radical polymerisation, e.g. ATRP.

The term polymerisable ethylenically unsaturated monomers applies to monomeric compounds characterised by the presence of the group >C═C< which are polymerisable in the known methods, such as conventional or controlled or "living" polymerisation. Controlled or "living" polymerisation is defined as a process wherein the polymerisation is initiated from an initiating fragment which adds monomers by radical poly-addition reactions under conditions which suppress undesirable side reactions, such as radical transfer to solvent, bimolecular termination or so-called disproportionation. The suppression of these side reactions is effected to such a degree that enables the formation of a block copolymer by subsequent addition of different monomers or the functionalisation of a terminal group to form a macromonomer. The method of living polymerisation is described in U.S. Pat. No. 4,581,429.

At least three different types of copolymers (I) are present in the compositions defined above, wherein
1) One group $A_x$-$B_y$ is attached to one polymer chain terminal group Y. In this case there is one radically transferable group, such as chlorine or bromine, per initiator fragment X. Each of p and q is one. Block copolymers wherein each of p and q is one and wherein the transferable group has been replaced with a polymerisable chain terminal group, are known as macromonomers;
2) More than one of the groups $A_x$-$B_y$ is attached to one polymer chain terminal group Y. In that embodiment p is a numeral greater than one, whereas q is one. Copolymers of this type are known as comb polymers or graft copolymers. They are obtained by further polymerising or copolymerising the polymerisable chain terminal group Y in the macromonomers by any known method of polymerisation;
3) More than one of the groups $A_x$-$B_y$ is attached to one initiator fragment X. The index p is one and the index q is a numeral greater than one. In this case up to six, preferably up to four, transferable groups are attached to the initiator fragment X. This type of copolymer comprises so-called star type or branched copolymers. In the event that p represents 1 and q represents 2 tri-block copolymers of the type $Y(A_x$-$B_y)X(A_x$-$B_y)Y$ are comprised. In the case that the chain terminal group Y is an unsaturated group, telechelic or multifunctional star type macromonomers are comprised, wherein the individual polymer "branches" are linked together at one initiator fragment X. Branched comb polymers (I) are obtainable from these macromonomers.

In copolymers (I) the group X represents the polymerisation initiator fragment of a polymerisation initiator of the formula $$X—Y'_q \qquad (II),$$

wherein
X represents the fragment of a polymerisation initiator capable of initiating polymerisation of ethylenically unsaturated monomers by atom transfer radical polymerisation (ATRP) in the presence of a catalyst capable of activating controlled radical polymerisaton by ATRP;
Y' represents a radically transferable atom or group; and
q represents one or a numeral greater than one.

A suitable polymerisation initiator is capable of initiating atom transfer radical polymerisation of the fragments A and B. The polymerisation subsequently proceeds by a reaction mechanism known under the term ATRP or related methods. A suitable polymerisation initiator, which contains a radically transferable atom or group ●Y', is described in WO 96/30421 and WO 98/01480. A preferred radically transferable atom or group ●Y' is ●Cl or ●Br, which is cleaved as a radical from the initiator molecule and may subsequently be replaced after polymerisation as a leaving group with a polymerisable chain terminal group. The index q is one if one group Y, e.g. chlorine or bromine, is present in the initiator molecule (II). A representative initiator molecule (II) wherein q is one, is a compound of the formula

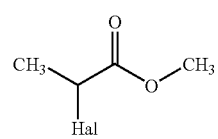

wherein Hal represents chlorine or bromine.

A representative initiator molecule, wherein q is the numeral three, is a "star-shaped" or "bird type" compound of the formula

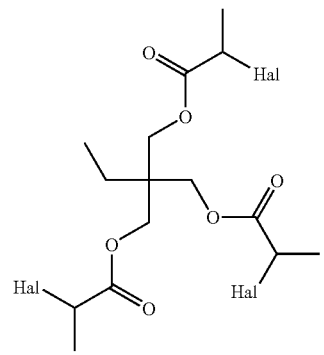

and a representative initiator molecule wherein q is the numeral up to four, is a "star-shaped" compound of the formula

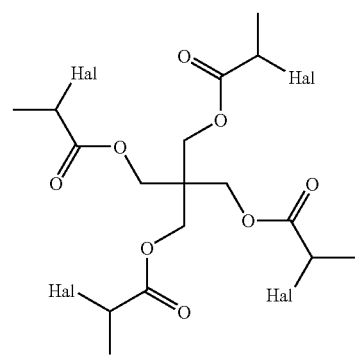

In the formulae above Hal represents chlorine or bromine. These initiator molecules are prepared by the reaction of a reactive functional derivative of α-halogen carboxylic acid of the formula

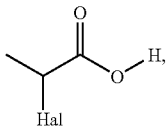

e.g. the acid chloride or bromide of this compound, with an alcohol of the formula

wherein $R_2$ together with the HO-group represents a branched trihydroxy alcohol, e.g. 1,1,1-(tris-hydroxymethyl)propane or represents a branched tetrahydroxy alcohol, e.g. pentaerythritol.

The use of initiators (II) wherein q represents one and one transferable group Y' is present per initiator fragment X and subsequent replacement of Y' with a polymerisable chain terminal group Y, generates linear macromonomers (I). Polymerisation initiators wherein q is greater than one, generate branched macromonomers (I), wherein the individual polymer "branches" are linked together at the initiator fragment X. Branched comb polymers (I) are obtainable from these macromonomers, particularly branched comb polymers from the "star-shaped" initiators of the formulae above.

A preferred polymerisation initiator (II), which generates linear polymers, block copolymers or macromonomers, is selected from the group consisting of $C_1$-$C_8$alkyl halides, $C_6$-$C_{15}$aralkyl-halides, $C_2$-$C_8$haloalkyl esters, arene sulphonyl chlorides, α-haloalkane nitriles, α-haloacrylates and halolactones.

Specific initiators (II) are selected from the group consisting of α,α'-dichloro- or α,α'-dibromoxylene, p-toluenesulphonylchloride (PTS), hexakis-(α-chloro- or α-bromomethyl)-benzene, 1-phenethyl chloride or bromide, methyl or ethyl 2-chloro- or 2-bromopropionate, methyl or ethyl-2-bromo- or 2-chlorooisobutyrate, and the corresponding 2-chloro- or 2-bromopropionic acid, 2-chloro- or 2-bromoisobutyric acid, chloro- or bromoacetonitrile, 2-chloro- or 2-bromopropionitrile, α-bromobenzacetonitrile, α-bromo-γ-butyrolactone (=2-bromo-dihydro-2(3H)-furanone) and the initiators derived from 1,1,1-(tris-hydroxymethyl)propane and pentaerythritol of the formulae of above.

In the copolymer (I) one of the polymer blocks A and B is composed of non-ionic repeating units of ethylenically unsaturated monomers suitable for the method of controlled or living polymerisation. Representative monomers are selected from the group consisting of styrenes, acrylic and $C_1$-$C_4$alkylacrylic acid-$C_1$-$C_{24}$alkyl esters, acrylic and $C_1$-$C_4$alkylacrylic acid-$C_6$-$C_{11}$aryl-$C_1$-$C_4$alkyl esters, acrylic and $C_1$-$C_4$alkylacrylic acid-$C_6$-$C_{11}$aryloxy-$C_1$-$C_4$alkyl esters, acrylic and $C_1$-$C_4$alkylacrylic acid-hydroxy-$C_2$-$C_6$alkyl esters, acrylic and $C_1$-$C_4$alkylacrylic acid-polyhydroxy-$C_3$-$C_6$alkyl esters, acrylic and $C_1$-$C_4$alkylacrylic acid-($C_1$-$C_4$alkyl)$_3$silyloxy-$C_2$-$C_4$alkyl esters; acrylic and $C_1$-$C_4$alkylacrylic acid-($C_1$-$C_4$alkyl)$_3$silyl-$C_1$-$C_4$alkyl esters, acrylic and $C_1$-$C_4$alkylacrylic acid-heterocyclyl-$C_2$-$C_4$alkyl esters; acrylic and $C_1$-$C_4$alkylacrylic acid esters having poly-$C_2$-$C_4$alkyleneglycol ester groups, wherein the ester groups may be substituted with $C_1$-$C_{24}$alkoxy groups, acrylic and methacrylic acid amides, acrylic and $C_1$-$C_4$alkylacrylic acid-($C_1$-$C_4$alkyl)$_{1-2}$amide, acrylonitrile, esters of maleic acid or fumaric acid, maleinimide and N-substituted maleinimides.

In a preferred embodiment of the invention one of the polymer blocks A and B is essentially composed of repeating units of ethylenically unsaturated monomers selected from the group consisting of styrenes, acrylic and methacrylic acid-$C_1$-$C_{24}$alkyl esters, acrylic and methacrylic acid-hydroxy-$C_2$-$C_6$alkyl esters, acrylic and methacrylic acid-dihydroxy-$C_3$-$C_4$alkyl esters and acrylic and methacrylic acid esters having poly-$C_2$-$C_4$alkyleneglycol ester groups, wherein the ester groups may be substituted with $C_1$-$C_{24}$alkoxy groups.

Suitable styrenes may be substituted at the phenyl group by one to three additional substituents selected from the group consisting of hydroxy, $C_1$-$C_4$alkoxy, e.g. methoxy or ethoxy, halogen, e.g. chloro, and $C_1$-$C_4$alkyl, e.g. methyl.

Suitable acrylic acid or methacrylic acid-$C_1$-$C_{24}$alkyl esters are acrylic acid or methacrylic acid esters esterified by methyl, ethyl, n-butyl, isobutyl, tert-butyl, neopentyl, 2-ethylhexyl, isobornyl, isodecyl, n-dodecyl, n-tetradecyl, n-hexadecyl or n-octadecyl.

Representative acrylic and $C_1$-$C_4$alkylacrylic acid-$C_6$-$C_{11}$aryl-$C_1$-$C_4$alkyl esters are acrylic acid or methacrylic acid esters esterified by benzyl, 2-phenylethyl, 1- or 2-naphthylmethyl or 2-(1- or 2-naphthyl)-ethyl. The phenyl or naphthyl groups may be additionally substituted with one to three additional substituents selected from the group consisting of hydroxy, $C_1$-$C_4$alkoxy, e.g. methoxy or ethoxy, halogen, e.g. chloro, and $C_1$-$C_4$alkyl, e.g. methyl or methyl.

Representative acrylic and $C_1$-$C_4$alkylacrylic acid-$C_6$-$C_{11}$aryloxy-$C_1$-$C_4$alkyl esters are acrylic acid or methacrylic acid esters esterified by 2-phenoxyethyl or 2-benzyloxyethyl.

Representative acrylic acid and $C_1$-$C_4$alkylacrylic acid-hydroxy-$C_2$-$C_4$alkyl esters are acrylic acid- or methacrylic acid-2-hydroxyethyl esters (HEA, HEMA) or acrylic acid- or methacrylic acid-2-hydroxypropyl ester (HPA, HPMA).

Representative acrylic and $C_1$-$C_4$alkylacrylic acid-polyhydroxy-$C_3$-$C_6$alkyl esters are acrylic acid- or methacrylic acid esterified by ethylene glycol or glycerol.

Representative acrylic acid- and $C_1$-$C_4$alkylacrylic acid-silyloxy-$C_2$-$C_4$alkyl esters are acrylic acid- or methacrylic acid-2-trimethylsilyloxyethyl esters (TMS-HEA, TMS-HEMA).

Representative acrylic acid- or $C_1$-$C_4$alkylacrylic acid-($C_1$-$C_4$alkyl)$_3$silyl-$C_2$-$C_4$alkyl esters are acrylic acid- or methacrylic acid-2-trimethylsilylethyl esters or acrylic acid- or methacrylic acid-3-trimethylsilyl-n-propyl esters.

Representative acrylic and $C_1$-$C_4$alkylacrylic acid esters having poly-$C_2$-$C_4$alkyleneglycol ester groups, wherein the ester groups may be substituted with $C_1$-$C_{24}$alkoxy groups are illustrated by the formula given below:

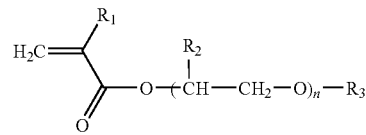

wherein
n represents a numeral from one to 100;
$R_1$ and $R_2$ independently of one another represent hydrogen or methyl; and
$R_3$ represents $C_1$-$C_{24}$alkyl, e.g. methyl, ethyl, n- or isopropyl, n-, iso-, or tert--butyl, n- or neopentyl, n-dodecyl, n-tetradecyl, n-hexadecyl, n-octadecyl, or represents aryl-$C_1$-$C_{24}$alkyl, e.g. benzyl or phenyl-n-nonyl, as well as $C_1$-$C_{24}$alkylaryl or $C_1$-$C_{24}$alkylaryl-$C_1$-$C_{24}$alkyl.

Representative acrylic acid- and $C_1$-$C_4$alkylacrylic acid-heterocyclyl-$C_2$-$C_4$alkyl esters are acrylic acid- or methacrylic acid-2-(N-morpholinyl, 2-pyridyl, 1-imidazolyl, 2-oxo-1-pyrrolidinyl, 4-methylpiperidin-1-yl or 2-oxoimidazolidin-1-yl)-ethyl esters.

Representative $C_1$-$C_4$alkylacrylic acid esters having poly-$C_2$-$C_4$alkyleneglycol ester groups, wherein the ester groups may be substituted with $C_1$-$C_{24}$alkoxy groups are acrylic acid- or methacrylic acid esters of ethoxylated decanol or ethoxylated lauryl or stearyl alcohol, wherein the degree of ethoxylation, as expressed by the index n in the formula above, is typically in the range from 5 to 30.

Representative acrylic and $C_1$-$C_4$alkylacrylic acid-($C_1$-$C_4$alkyl)$_{1-2}$amide are acrylic acid- or methacrylic acid N-methyl, N,N-dimethyl, N-ethyl or N,N-diethyl amide.

Representative esters of maleic acid or fumaric acid are the $C_1$-$C_{24}$alkyl esters, e.g. the methyl, ethyl, n-butyl, isobutyl, tert-butyl, neopentyl, 2-ethylhexyl, isobornyl, isodecyl, n-dodecyl, n-tetradecyl, n-hexadecyl or n-octadecyl esters, the $C_6$-$C_{11}$aryl, e.g. phenyl or naphthyl, esters or the $C_6$-$C_{11}$aryl-$C_1$-$C_4$alkyl esters, e. g. benzyl or 2-phenethyl esters. The phenyl or naphthyl groups may be additionally substituted with one to three additional substituents selected from the group consisting of hydroxy, $C_1$-$C_4$alkoxy, e.g. methoxy or ethoxy, halogen, e.g. chloro, and $C_1$-$C_4$alkyl, e.g. methyl.

Representative N-substituted maleinimides are the N—$C_1$-$C_4$alkyl, e.g. N-methyl or N-ethyl, or N-aryl, e.g. N-phenyl substituted maleinimides.

According to the embodiment (i) one of the polymer blocks A or B or the chain terminal group Y additionally in the copolymer (I) contains repeating units of ethylenically unsaturated monomers substituted with basic groups. A suitable ethylenically unsaturated monomer substituted with a basic group present in one of the polymer blocks A and B or the chain terminal group Y is represented by a compound of the formula

$$CH_2=C(-R^1)-C(=O)-R^2 \quad (III),$$

wherein $R^1$ represents hydrogen or $C_1$-$C_4$alkyl; and $R^2$ represents a basic substituent selected from the group consisting of amino-$C_2$-$C_{18}$alkoxy, $C_1$-$C_4$alkylamino-$C_2$-$C_{18}$alkoxy, di-$C_1$-$C_4$alkylamino-$C_2$-$C_{18}$alkoxy, hydroxy-$C_2$-$C_4$alkylamino -$C_2$-$C_{18}$alkoxy and $C_1$-$C_4$alkyl-(hydroxy-$C_2$-$C_4$alkyl)amino-$C_2$-$C_{18}$alkoxy; or wherein the ethylenically unsaturated monomer substituted with a basic group present in one of the polymer blocks A and B or the chain terminal group Y is an amino monomer selected from the group consisting of amino substituted styrene, ($C_1$-$C_4$alkyl)$_{1-2}$amino substituted styrene, N-mono-($C_1$-$C_4$alkyl)$_{1-2}$amino-$C_2$-$C_4$alkyl(meth)acryl amide and N,N-di-($C_1$-$C_4$alkyl)$_{1-2}$amino-$C_2$-$C_4$alkyl(meth)acryl amide, vinyl pyridine or $C_1$-$C_4$alkyl substituted vinyl pyridine, vinyl imidazole and $C_1$-$C_4$alkyl substituted vinyl imidazole.

According to the alternate embodiment (i') one of the polymer blocks A or B or the chain terminal group Y in the copolymer (I) additionally contains repeating units of ethylenically unsaturated monomers substituted with acidic groups. A suitable ethylenically unsaturated monomer substituted with an acidic group present in one of the polymer blocks A and B or the chain terminal group Y is represented by a compound of the formula (III), wherein $R^1$ represents hydrogen or $C_1$-$C_4$alkyl; and $R^2$ represents $C_1$-$C_4$alkyl substituted by carboxy, sulpho or phosphono.

Representative styrenes are substituted at the phenyl group with one or two amino groups or one or two ($C_1$-$C_4$alkyl)$_{1-2}$ amino groups, particularly one amino group in 4-position. Additional substituents are selected from the group consisting of hydroxy, $C_1$-$C_4$alkoxy, e.g. methoxy or ethoxy, halogen, e.g. chloro, or $C_1$-$C_4$alkyl, e.g. methyl or ethyl.

Representative N-mono-($C_1$-$C_4$alkyl)$_{1-2}$amino-$C_2$-$C_4$alkyl(meth)acryl amide and N,N-di-($C_1$-$C_4$alkyl)$_{1-2}$amino-$C_2$-$C_4$alkyl(meth)acryl amide are 2-N-tert-butylamino- or 2-N,N-dimethylaminoethylacrylamide or 2-N-tert-butylamino- or 2-N,N-dimethylaminopropylmethacrylamide.

In a particularly preferred embodiment of the invention the repeating unit of an ethylenically unsaturated monomer substituted with a basic group present in one of the polymer blocks A and B is represented by a compound of the formula (III), wherein $R^1$ represents hydrogen or methyl; and $R^2$ represents amino substituted $C_2$-$C_{18}$alkoxy selected from the group consisting of amino-$C_2$-$C_4$alkoxy, $C_1$-$C_4$alkylamino-$C_2$-$C_4$alkoxy, di-$C_1$-$C_4$alkylamino-$C_2$-$C_4$alkoxy, hydroxy-$C_2$-$C_4$alkylamino-$C_2$-$C_{18}$alkoxy and $C_1$-$C_4$alkyl-(hydroxy-$C_2$-$C_4$alkyl)amino-$C_2$-$C_4$alkoxy;

or is amino substituted styrene, ($C_1$-$C_4$alkyl)$_{1-2}$amino substituted styrene, and N,N-di-($C_1$-$C_4$alkyl)$_2$amino-$C_2$-$C_4$alkyl (meth)acryl amide.

The repeating unit of an ethylenically unsaturated monomer substituted with a basic group present in one of the polymer blocks A or B as described above forms a salt with the salt forming compound (ii) by acid-base reaction, acid addition or quaternisation reaction.

In a particularly preferred embodiment of the invention the unsaturated monomer substituted with a basic group present in one of the polymer blocks A and B is represented by an 2-ammoniumethyl ester group of the formula

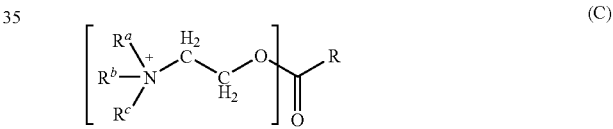

wherein $R^a$, $R^b$ and $R^c$ independently of one another represent hydrogen or a substituent selected from the group consisting of $C_1$-$C_4$alkyl, aryl-$C_1$-$C_4$alkyl and ($C_1$-$C_4$alkyl)$_{1-3}$aryl.

In an especially preferred embodiment of the invention the repeating unit of an ethylenically unsaturated monomer substituted with a basic group is represented by an amino monomer selected from the group consisting of 4-aminostyrene, 4-dimethylaminostyrene, an amino alkyl(meth)acrylate selected from the group consisting of 2-dimethylaminoethyl acrylate (DMAEA), 2-dimethylaminoethyl methacrylate (DMAEMA), 2-diethylaminoethyl acrylate (DEAEA), 2-diethylaminoethyl methacrylate (DEAEMA), 2-t-butylaminoethyl acrylate (t-BAEA), 2-t-butylaminoethyl methacrylate (t-BAEMA) and 3-dimethylaminopropylmethacrylamide, 4-vinylpyridine, 2-vinylpyridine and 1-vinylimidazole.

The index numbers x and y independently of one another define the number of monomer units present in the polymer blocks A and B. One of x and y represents zero, one or a numeral greater than one and the other one represents a numeral greater than one. At least one of the index numbers x and y represents a numeral greater than one. In the event that one of the index numbers x and y is zero, the copolymer (I) is a macromonomer which may be converted to a comb polymer. A range from two to 1000 is preferred for the sum of x and y. The preferred molecular weight range of both polymer blocks A and B is from about 1 000 to 100 000, preferably about 1 000 to 50 000. A particularly preferred molecular weight range is from about 1 000 to 15 000.

The polymerisation process may be carried out in the presence of water or an organic solvent or mixtures thereof. Additional co-solvents or surfactants, such as glycols or ammonium salts of fatty acids, may be added to the reaction mixture. The amount of solvent should be kept as low as possible. The reaction mixture may contain the above-mentioned monomers or oligomers in an amount of 1.0 to 99.9% by weight, preferably 5.0 to 99.9% by weight, and especially preferably 50.0 to 99.9% by weight, based on the monomers present in the polymerisate.

If organic solvents are used, suitable solvents or mixtures of solvents are typically pure alkanes (hexane, heptane, octane, isooctane), hydrocarbons (benzene, toluene, xylene), alkanols (methanol, ethanol, ethylene glycol, ethylene glycol monomethyl ether), esters (ethyl n-propyl, n-butyl or n-hexyl acetate) and ethers (diethyl or dibutyl ether, ethylene glycol dimethyl ether, tetrahydrofuran), or mixtures thereof.

If water is used as a solvent the reaction mixture can be supplemented with a water-miscible or hydrophilic co-solvent. The reaction mixture will then remain in a homogeneous single phase throughout the monomer conversion. Any water-soluble or water-miscible co-solvent may be used, as long as the aqueous solvent medium is effective in providing a solvent system, which prevents precipitation or phase separation of the reactants or polymer products until full completion of the polymerisation. Exemplary co-solvents useful in the process may be selected from the group consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organosulphides, sulphoxides, sulphones, alcohol derivatives, hydroxyether derivatives such as butyl carbitol or cellosolve, amino alcohols, ketones, and the like, as well as derivatives and mixtures thereof. Specific examples include methanol, ethanol, propanol, dioxan, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic solvents are selected for the process, the water to co-solvent weight ratio is typically in the range of about 99:1 to about 10:90.

When monomer mixtures or monomer/oligomer mixtures are used, the calculation of mol % is based on an average molecular weight of the mixture.

The polymerisation temperature may range from about 50° C. to about 180° C., preferably from about 80° C. to about 150° C. At temperatures above about 180° C., the controlled conversion of the monomers into polymers may decrease, and undesirable by-products like thermally initiated polymers are formed or decomposition of the components may occur.

A suitable catalyst capable of activating ATRP is a transition metal complex catalyst salt present as an oxidisable complex ion in the lower oxidation state of a redox system. Preferred examples of such redox systems are selected from the group consisting of Group V(B), VI(B), VII(B), VIII, IB and IIB elements, such as $Cu^+/Cu^{2+}$, $Cu^0/Cu^+$, $Fe^0/Fe^{2+}$, $Fe^{2+}/Fe^{3+}$, $Cr^{2+}/Cr^{3+}$, $Co^+/Co^{2+}$, $Co^{2+}/Co^{3+}$, $Ni^0/Ni^+$, $Ni^+/Ni^{2+}$, $Ni^{2+}/Ni^{3+}$, $Mn^0/Mn^{2+}$, $Mn^{2+}/Mn^{3+}$, $Mn^{3+}/Mn^{4+}$ or $Zn^+/Zn^{2+}$.

The ionic charges are counterbalanced by anionic ligands commonly known in complex chemistry of transition metals, such hydride ions ($H^-$) or anions derived from inorganic or organic acids, examples being halides, e.g. $F^-$, $Cl^-$, $Br^-$ or $I^-$, halogen complexes with transition metals, such as $Cu^I Br_2^-$, halogen complex ions of the type $BF_4^-$, $PF_6^{31}$, $SbF_6^-$ or $AsF_6^-$, anions of oxygen acids, alcoholates or acetylides or the anion of cyclopentadiene.

Anions of oxygen acids are, for example, sulphate, phosphate, perchlorate, perbromate, periodate, antimonate, arsenate, nitrate, carbonate, the anion of a $C_1$-$C_8$carboxylic acid, such as formate, acetate, propionate, butyrate, benzoate, phenylacetate, mono-, di- or trichloro- or -fluoroacetate, sulphonates, for example methyl-, ethyl-, n-propyl- or n-butylsulphonate, trifluoromethylsulphonate (triflate), unsubstituted or $C_1$-$C_4$alkyl-, $C_1$-$C_4$alkoxy- or halo-, especially fluoro-, chloro- or bromo-substituted phenylsulphonate or benzylsulphonate, for example tosylate, mesylate, brosylate, p-methoxy- or p-ethoxyphenylsulphonate, pentafluorophenylsulphonate or 2,4,6-triisopropylsulphonate, phosphonates, for example methylphosphonate, ethylphosphonate, propylphosphonate, butylphosphonate, phenylphosphonate, p-methylphenylphosphonate or benzylphosphonate, carboxylates derived from a $C_1$-$C_8$carboxylic acid, for example formate, acetate, propionate, butyrate, benzoate, phenylacetate, mono-, di- or trichloro- or -fluoroacetate, and also $C_1$-$C_{12}$alcoholates, such as straight chain or branched $C_1$-$C_{12}$alcoholates, e.g. methanolate or ethanolate.

Anionic ligands and neutral may also be present up to the preferred coordination number of the complex cation, especially four, five or six. Additional negative charges are counterbalanced by cations, especially monovalent cations such as $Na^+$, $K^+$, $NH_4^+$ or $(C_1$-$C_4alkyl)_4N^+$.

Suitable neutral ligands are inorganic or organic neutral ligands commonly known in complex chemistry of transition metals. They coordinate to the metal ion through a σ-, π-, μ- or η-type bonding or any combinations thereof up to the preferred coordination number of the complex cation. Suitable inorganic ligands are selected from the group consisting of aquo ($H_2O$), amino, nitrogen, carbon monoxide and nitrosyl. Suitable organic ligands are selected from the group consisting of phosphines, e.g. $(C_6H_5)_3P$, $(i$-$C_3H_7)_3P$, $(C_5H_9)_3P$ or $(C_6H_{11})_3P$, di-, tri-, tetra- and hydroxyamines, such as ethylenediamine, ethylenediaminotetraacetate (EDTA), N,N-Dimethyl-N',N'-bis(2-dimethylaminoethyl)-ethylenediamine (Me₆TREN), catechol, N,N'-dimethyl-1,2-benzenediamine, 2-(methylamino)phenol, 3-(methylamino)-2-butanol or N,N'-bis(1,1-dimethylethyl)-1,2-ethanediamine, N,N,N',N'',N''-pentamethyldiethylenetramine (PMDETA), $C_1$-$C_8$-glycols or glycerides, e.g. ethylene or propylene glycol or derivatives thereof, e.g. di-, tri- or tetraglyme, and mono- or bidentate heterocyclic $e^-$ donor ligands.

Heterocyclic $e^-$ donor ligands are derived, for example, from unsubstituted or substituted heteroarenes from the group consisting of furan, thiophene, pyrrole, pyridine, bispyridine, picolylimine, γ-pyran, γ-thiopyran, phenanthroline, pyrimidine, bis-pyrimidine, pyrazine, indole, coumarone, thionaphthene, carbazole, dibenzofuran, dibenzothiophene, pyrazole, imidazole, benzimidazole, oxazole, thiazole, bis-thiazole, isoxazole, isothiazole, quinoline, bis-quinoline, isoquinoline, bis-isoquinoline, acridine, chromene, phenazine, phenoxazine, phenothiazine, triazine, thianthrene, purine, bis-imidazole and bis-oxazole.

The oxidisable transition metal complex catalyst can be formed in a separate preliminary reaction step from its ligands or is preferably formed in-situ from its transition metal salt, e.g. Cu(I)Cl, which is then converted to the complex compound by addition of compounds corresponding to the ligands present in the complex catalyst, e.g. by addition of ethylenediamine, EDTA, Me₆TREN or PMDETA.

The transition metal in the oxidisable transition metal complex catalyst salt is converted from its lower oxidation state in the above-mentioned redox systems to its higher oxidation state. In a preferred embodiment of the process a Cu(I) complex catalyst salt is converted to the corresponding Cu(II) oxidation state.

Because the present polymerisation by ATRP is a "living" polymerisation, it can be started and terminated practically at will. The copolymers (I) as obtained by the process have a low polydispersity. Preferably the polydispersity is from 1.01 to 2.20, more preferably from 1.01 to 1.90, and most preferably from 1.01 to 1.50.

The various advantages of the process of this type that allow a large range of polymerisation reactions are described by K. Matyjaszewski in *ACS Symp. Ser. Vol.* 685 (1998), pg. 2-30.

In a block copolymer (I) Y represents a polymer chain terminal group. A suitable chain terminal group is a radically transferable group, hydrogen, a polymerisable chain terminal group or a saturated polymer chain terminal group, which is formed by polymerisation or copolymerisation of a polymerisable chain terminal group.

A radically transferable group is a group that results from ATRP with suitable initiators of the formula II described above, such as chlorine or bromine.

An alternative embodiment relates to compositions comprising copolymers (I), e.g. macromonomers, wherein Y is a polymerisable chain terminal group. Such group contains at least one polymerisable, ethylenically unsaturated monomer unit that has the same preferred meanings in respect of the polymerised saturated monomer units present in a linear chain terminal group Y.

A preferred polymerisable chain terminal group is an ethylenically unsaturated group corresponding to monomers selected from the group consisting of styrenes, acrylic acid, $C_1$-$C_4$alkylacrylic acid, amides, anhydrides and salts of acrylic acid or $C_1$-$C_4$alkylacrylic acid, acrylic acid-$C_1$-$C_{24}$alkyl esters and $C_1$-$C_4$alkylacrylic acid-$C_1$-$C_{24}$alkyl esters, acrylonitrile, methacrylonitrile, vinyl substituted heterocycles, styrene sulphonic acid and salts, vinyl benzoic acid and salts, vinyl formamide and amidosulphonic acid derivatives.

The macromonomers are prepared by known methods such as the ones described WO 01/51534, e.g. by reacting a copolymer (I) obtainable by ATRP, wherein Y is a radically transferable atom or group, e.g. halogen, with ethylenically unsaturated monomers as defined above.

The elimination of the transfer group Y, e.g. halogen, with the polymerisable chain terminal group X is advantageously performed in such a way that the polymerisate is dissolved in a solvent and the monomeric compound corresponding to X is added in the presence of a non-nucleophilic base such as diazabicycloundecene (DBU) or other bases at higher temperatures. The reaction, which is a conventional esterification reaction, takes place under the conditions of a regular esterification reaction within a temperature range from room temperature to the boiling temperature of the reaction mixture, preferably from room temperature to 100° C.

Copolymers (I) wherein Y is saturated polymer chain terminal group Y, e.g. comb polymers, are obtained by further polymerising the macromonomers of above with ethylenically unsaturated monomers by any known method of polymerisation, such as radical polymerisation with initiators of the nitrile type, e.g. AIBN, or peroxides, e.g. benzoyl peroxide or di-tert-butyl peroxide. In the alternative the copolymerisation of the macromonomer with co-monomers can also be conducted by ATRP or any other method of controlled radical polymerisation, such as like nitroxyl mediated controlled free radical polymerisation.

A preferred embodiment relates to a composition, which comprises a copolymer of the formula (I), wherein X represents a polymer chain terminal group from a polymerisation initiator which is selected from the group consisting of $C_1$-$C_8$alkyl halides, $C_6$-$C_{15}$aralkyl halides, $C_2$-$C_8$haloalkyl esters, arene sulphonyl halides, α-haloalkane nitriles and halolactones;

Y represents a radically transferable group, hydrogen or a polymerisable chain terminal group; and p and q represent one.

Another preferred embodiment relates to a composition, which comprises a copolymer of the formula (I), wherein X represents a polymer chain terminal group from a polymerisation initiator which is selected from the group consisting of $C_1$-$C_8$alkyl halides, $C_6$-$C_{15}$aralkyl halides, $C_2$-$C_8$haloalkyl esters, arene sulphonyl halides, a-haloalkane nitrites and halolactones;

Y represents a saturated polymer chain terminal group;

p represents a numeral greater than one; and q represents one.

In the composition according to the present invention the salt forming compound (ii) or (ii') forms a salt with the copolymer (I) by acid-base reaction, acid addition or quaternisation reaction.

In particular, the acidic group, such as the sulpho, carboxy or phosphono group, the sulphonic acid-$C_1$-$C_4$alkylester group or the $C_1$-$C_8$alkyl halide group, which is present in the salt forming compound (ii), forms a salt by reaction with a basic group, such as the free amino group or a primary, secondary or tertiary amino group, which is present in one of the polymer blocks A and B or the chain terminal group Y of the copolymer component (I). In an alternative embodiment of the invention the acidic group, such as the sulpho, carboxy or phosphono group is present in one of the polymer blocks A and B or the chain terminal group Y of the copolymer component (I). The salt forming compound (ii') then contains the free amino group or a primary, secondary or tertiary amino group.

A suitable salt forming compound (ii) is an organic acid selected from the group consisting of monocyclic or polycyclic sulphonic, mono- or polycyclic carboxylic or phosphonic acids, aliphatic sulphonic, carboxylic or phosphonic acids substituted with mono- or polycyclic groups, $C_1$-$C_8$alkyl halides substituted with mono- or polycyclic groups and $C_1$-$C_4$alkyl esters of mono- or polycyclic sulphonic acids, provided that p-toluenesulphonic acid is excluded as salt-forming component (ii).

In a preferred embodiment of the invention the salt forming compound (ii) is an organic acid selected from the group consisting polycyclic sulphonic, mono- or polycyclic carboxylic or phosphonic acids, aliphatic sulphonic, carboxylic or phosphonic acids substituted with mono- or polycyclic groups, $C_1$-$C_8$alkyl halides substituted with mono- or polycyclic groups and $C_1$-$C_4$alkyl esters of mono- or polycyclic sulphonic acids.

The term monocyclic defines the presence of a carbo- or heterocycloaliphatic, e.g. $C_3$-$C_8$cycloalkyl, or an aromatic carbocyclic or heterocyclic group, e.g. phenyl.

The term polycyclic defines the presence of more than one cyclic group in a given molecular structure, especially two or three cyclic groups. The cyclic groups may be saturated or unsaturated, carbocyclic or heterocyclic. Polycyclic sulphonic acids have at least two cyclic groups, e.g. two aromatic, e.g. two condensed aromatic groups, or condensed bicycloaliphatic or bicycloaliphatic aromatic groups.

Mono- or polycyclic sulphonic, carboxylic or phosphonic acids comprise within their given molecular structure at least one cyclic group, e.g. one or two aromatic, e.g. two condensed aromatic groups, or one or two cycloaliphatic groups, condensed bicycloaliphatic or cycloaliphatic aromatic groups.

In a preferred embodiment the mono- or polycyclic groups present in the sulphonic, carboxylic and phosphonic acids or the mono- or polycyclic substituents of the aliphatic sulphonic, carboxylic or phosphonic acids are selected from the group consisting of saturated or unsaturated mono- or bicycloaliphatic, heteromonocycloliphatic or heterobicycloaliphatic, carbomonocyclic or carbobicyclic aromatic, partially saturated carbobicyclic aromatic, heteromonocyclic or heterobicyclic aromatic and partially saturated heterobicyclic aromatic groups.

A preferred group of substituted mono- or polycyclic sulphonic, carboxylic and phosphonic acids is represented by the general formula:

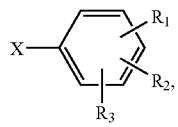

(IV)

wherein
X represents sulpho, carboxy or $P(=O)(OH)_2$; and
$R_1$, $R_2$ or $R_3$ independently of one another represent hydrogen or a substituent selected from the group consisting of functional groups or derivatised functional groups selected from the group consisting of amino, $C_1$-$C_4$alkylamino, $C_1$-$C_4$-dialkylamino, hydroxy, oxo, thio, —$NO_2$, carboxy, carbamoyl, sulpho, sulphamoyl, ammonio, amidino, cyano, formylamino, formamido and halogen; or
$R_1$, $R_2$ or $R_3$ independently of one another represent saturated or unsaturated aliphatic, cycloaliphatic or heterocycloaliphatic groups, carbocyclic or heterocyclic aryl groups, condensed carbocyclic, heterocyclic or carbocyclic-heterocyclic groups, which may additionally be combined with one of these groups or which may additionally be substituted with one of the functional groups or derivatised functional groups mentioned above.

The substituent groups may additionally be interrupted with one or more bivalent groups selected from the group consisting of —O—, —S—, —C(=O)—O—, —O—C(=O)—, —C(=O)—N($C_1$-$C_4$alkyl)-, —N($C_1$-$C_4$alkyl)—C(=O)—, —S(=O)—, —S(=O)$_2$—, —S(=O)—O—, —S(=O)$_2$—O—, —O—S(=O)—, —O—S(=O)$_2$—, —S(=O)—N($C_1$-$C_4$alkyl)-, —S(=O)$_2$—N($C_1$-$C_4$alkyl)-, —($C_1$-$C_4$alkyl)N—S(=O)—, —($C_1$-$C_4$alkyl)N—S(=O)$_2$—, —P(=O)—, —P(=O)—O—, —O—P(=O)— and —O—P(=O)—O—.

Two substituents from the group $R_1$ and $R_2$ may also represent bivalent, bridge-type $C_2$-$C_6$alkylen-, $C_4$-$C_8$alkyldiyliden- or $C_4$-$C_8$alkenyldiyliden groups which are connected with one of the above-mentioned cyclic or bicyclic groups.

p-Toluenesulphonic acid (PTSA) is excluded from the definitions above.

Specific salt forming compounds (ii), which are selected from the group consisting of mono- or polycyclic sulphonic acids, are illustrated by their structural formulae given below:

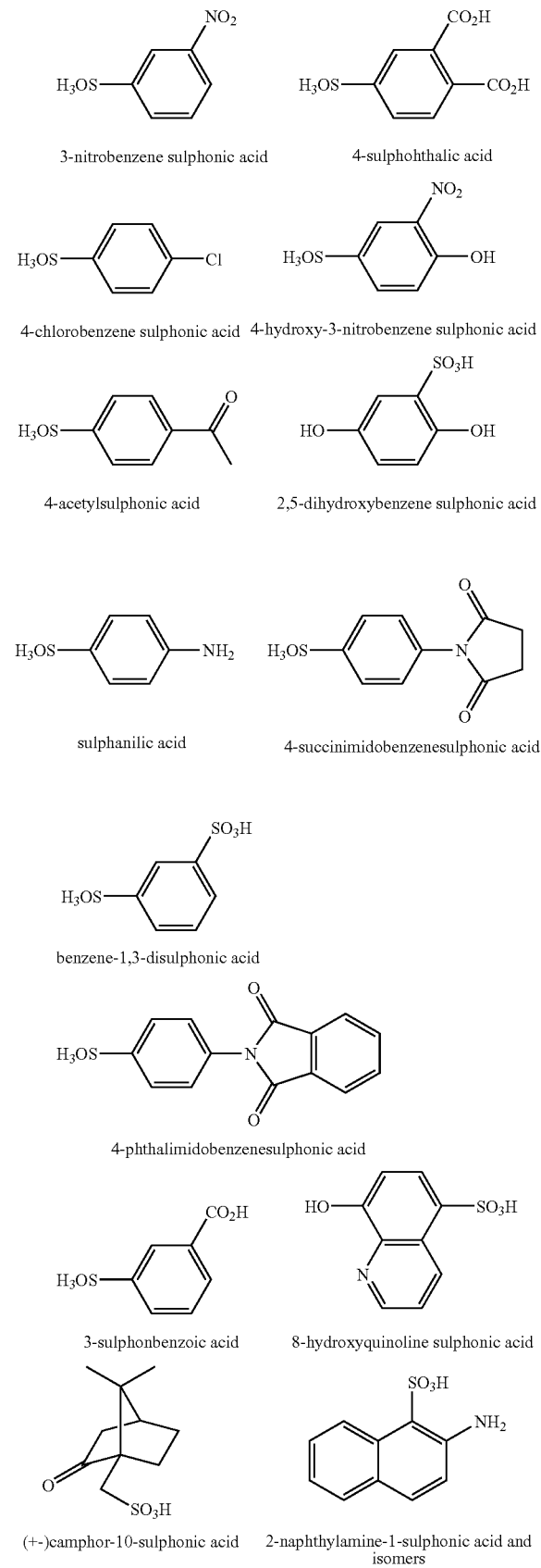

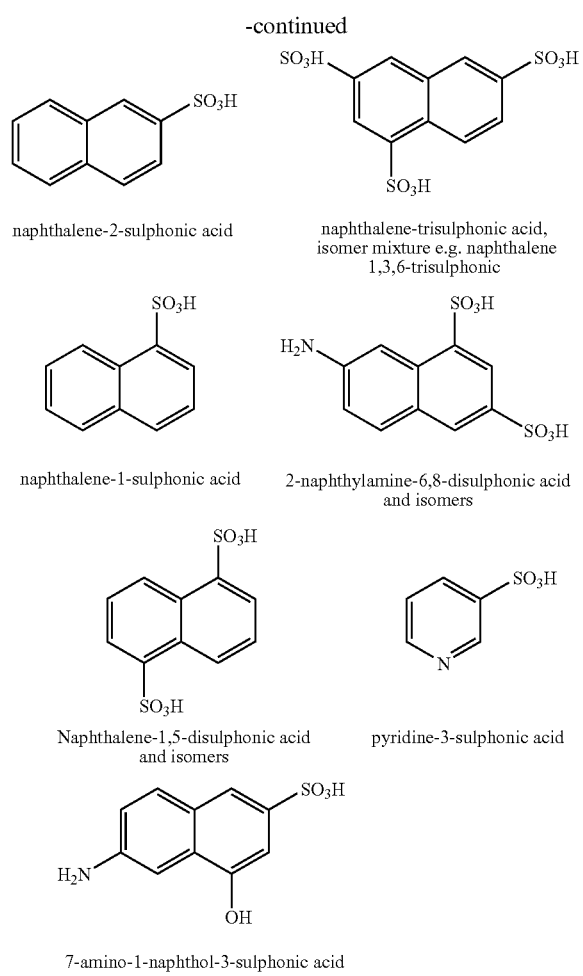

naphthalene-2-sulphonic acid naphthalene-trisulphonic acid, isomer mixture e.g. naphthalene 1,3,6-trisulphonic naphthalene-1-sulphonic acid 2-naphthylamine-6,8-disulphonic acid and isomers Naphthalene-1,5-disulphonic acid and isomers pyridine-3-sulphonic acid 7-amino-1-naphthol-3-sulphonic acid Specific salt forming compounds (ii) that are selected from the group consisting of mono- or polycyclic carboxylic acids are illustrated by their structural formulae given below:

phthalic acid trimellitic acid anhydride isophthalic acid 5-nitro-isophthalic acid

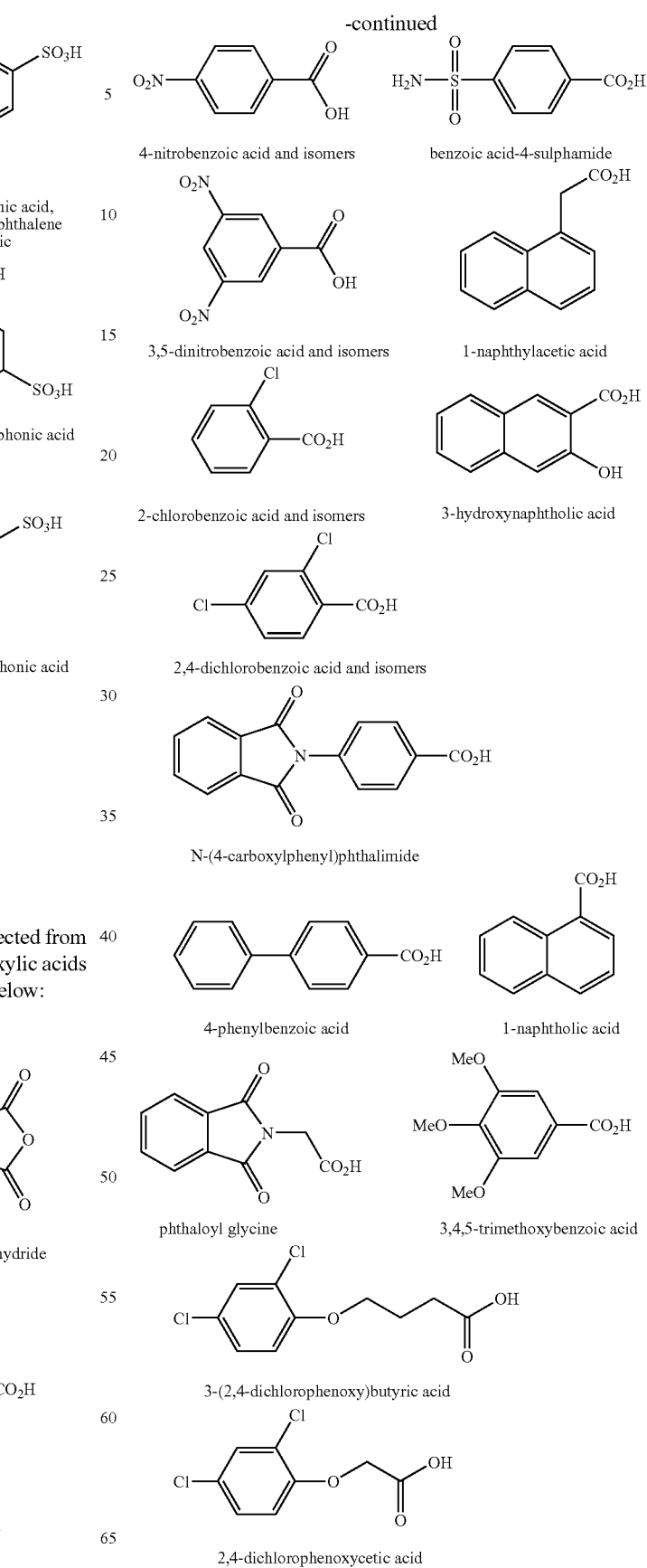

4-nitrobenzoic acid and isomers benzoic acid-4-sulphamide 3,5-dinitrobenzoic acid and isomers 1-naphthylacetic acid 2-chlorobenzoic acid and isomers 3-hydroxynaphtholic acid 2,4-dichlorobenzoic acid and isomers N-(4-carboxylphenyl)phthalimide 4-phenylbenzoic acid 1-naphtholic acid phthaloyl glycine 3,4,5-trimethoxybenzoic acid 3-(2,4-dichlorophenoxy)butyric acid 2,4-dichlorophenoxycetic acid -continued

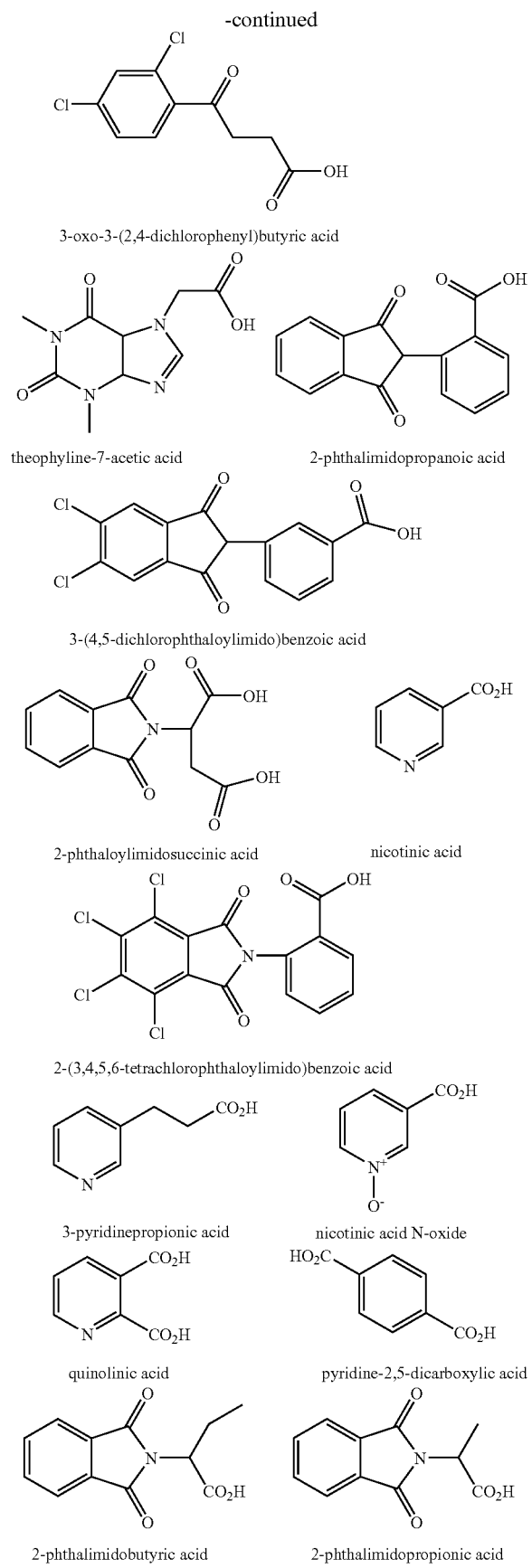

3-oxo-3-(2,4-dichlorophenyl)butyric acid theophyline-7-acetic acid    2-phthalimidopropanoic acid 3-(4,5-dichlorophthaloylimido)benzoic acid 2-phthaloylimidosuccinic acid    nicotinic acid 2-(3,4,5,6-tetrachlorophthaloylimido)benzoic acid 3-pyridinepropionic acid    nicotinic acid N-oxide quinolinic acid    pyridine-2,5-dicarboxylic acid 2-phthalimidobutyric acid    2-phthalimidopropionic acid -continued

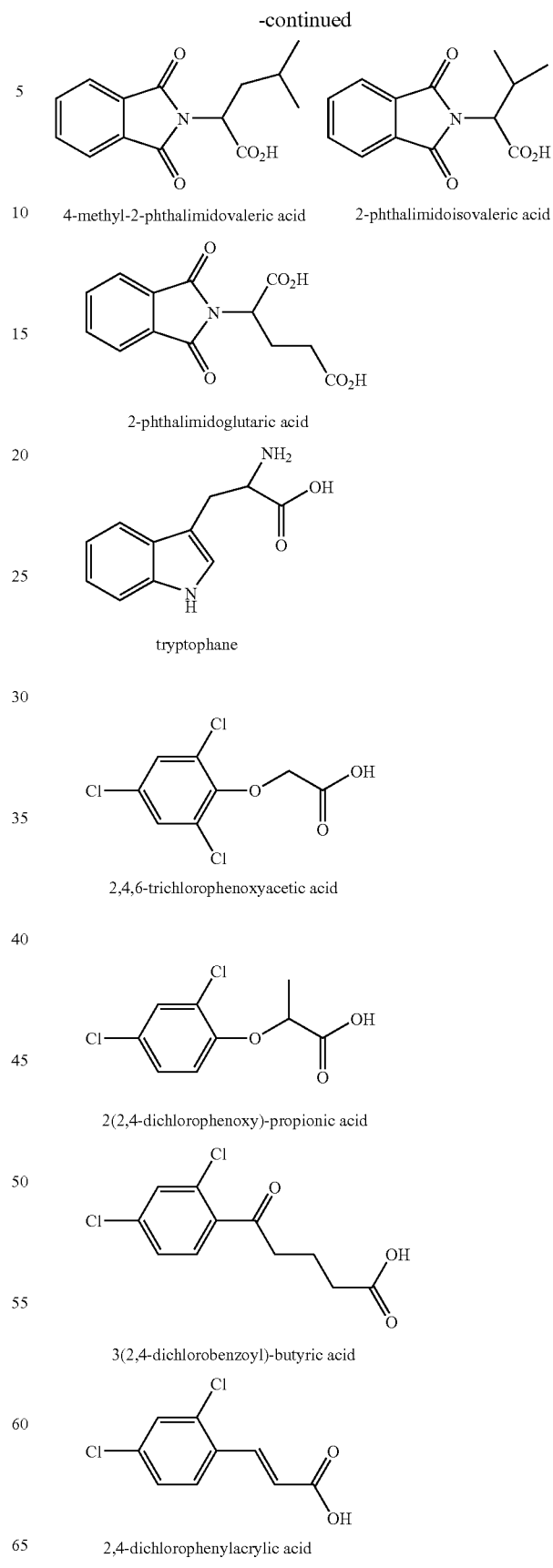

4-methyl-2-phthalimidovaleric acid    2-phthalimidoisovaleric acid 2-phthalimidoglutaric acid tryptophane 2,4,6-trichlorophenoxyacetic acid 2(2,4-dichlorophenoxy)-propionic acid 3(2,4-dichlorobenzoyl)-butyric acid 2,4-dichlorophenylacrylic acid -continued

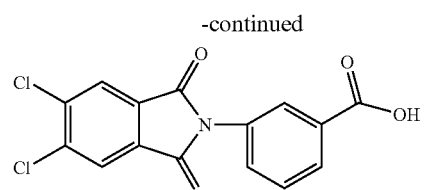

3(4,5-dichlorophthalimido)-benzoic acid

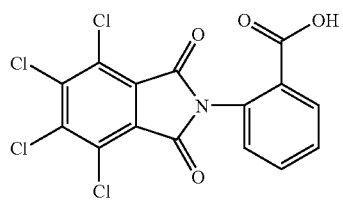

2-tetrachlorophthalimidobenzoic acid

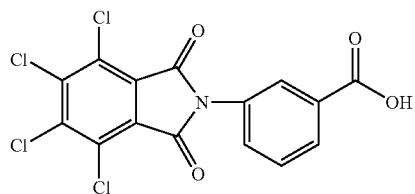

3-tetrachlorophthalimidobenzoic acid

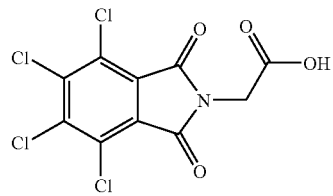
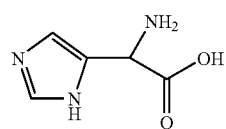

tetrachlorophthaloylglycine   Histidine

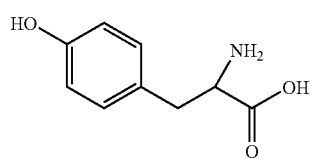

tyrosine

Further specific salt forming compounds (ii), which are selected from the group consisting of mono- or polycyclic carboxylic acids and phosphonic acids are illustrated by their structural formulae given below:

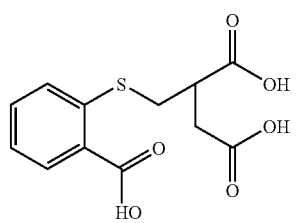

2-(2-carboxyphenylthiomethyl)succinic acid

-continued

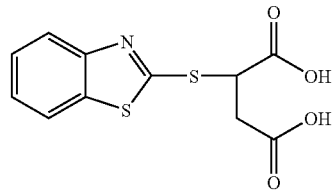

2-(2-benzothiazolylthio)succinic acid

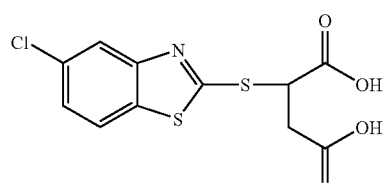

2-[2-(5-chlorobenzothiazolylthio)]succinic acid

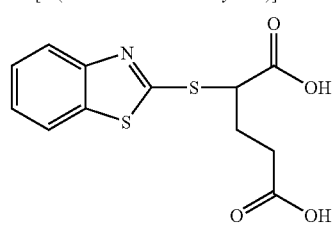

2-(2-benzothiazolylthio)succinic acid

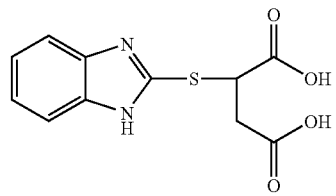

2-(2-benzimidazolylthio)succinic acid

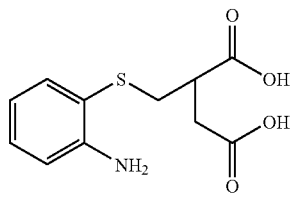

2-(2-aminophenylthiomethyl)succinic acid

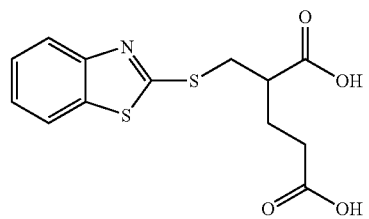

2-(2-benzimidazolylthio)valeric acid

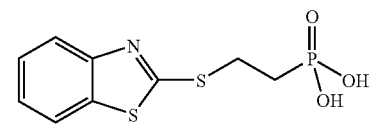

3-(2-benzothiazolylthio)propanephosphonic acid

Preferred sulphonic acid-$C_1$-$C_4$alkyl esters suitable as a salt forming compounds (ii) are the methyl or ethyl esters of p-toluenesulphonic acid or the methyl or ethyl esters of the sulphonic acids mentioned above and illustrated by their structural formulae.

Preferred $C_1$-$C_8$alkyl halides substituted with the above-mentioned mono-, bi- or tricyclic groups are benzyl chloride, 2-chlorobenzylchloride, 4-chlorobenzylchloride, 2,4-dichlorobenzylchloride.

In another preferred embodiment, the salt groups on the copolymer are derived from an aminic structure of a compound (III) by quaternisation with active aryl-$C_1$-$C_4$alkyl halides or $C_1$-$C_4$alkyl esters of organic sulphonic acids. In this case examples of preferred salt forming compounds (II) are benzyl chloride, 2chlorobenzylchloride, 4-chlorobenzylchloride, 2,4-dichlorobenzylchloride, p-toluenesulphonic acid methyl ester, p-toluenesulphonic acid ethyl ester and the methyl- or ethyl esters of the polycyclic sulphonic acids described above.

According to another embodiment of the invention the acidic group present in the salt forming compounds (ii), particularly the sulpho, carboxy or phosphono group, may be attached directly or with a bivalent bridge group to any aliphatic, cycloaliphatic, aliphatic cycloaliphatic, aromatic or aromatic aliphatic hydrocarbon backbone from a UV-absorber moiety.

Preferred bivalent groups are selected from the group consisting of —O—, —O—C(=O)—, —C(=O)—O—, —O($C_1$-$C_8$alkylene)- and $C_1$-$C_8$alkylene.

The term UV-light absorber moiety comprises any structural moiety effective as a photostable UV-filter which is derived from UV-light absorber compounds present in cosmetic and pharmaceutical preparations for protecting the human epidermis or human hair from UV-radiation, particularly in the range from 290 to 400 nm. Examples of suitable UV-light absorber moieties are described in U.S. Pat. No. 6,132,703. A preferred UV-light absorber moiety is a substituent selected from the group consisting of 2-(2'-hydroxyphenyl)benzotriazoles, 2-hydroxybenzophenones, benzoic acid esters, oxanilides and 2-(2-hydroxyphenyl)-1,3,5-triazines.

Specific 2-(2'-hydroxyphenyl)benzotriazoles are 2-(2'-hydroxy-5'-methylphenyl)-benzotriazole, 2-(2',4'-dihydroxyphenyl)-benzotriazole, 2-[3'-tert-butyl-2'-hydroxy-5'-(1-hydroxycarbonyl-2-ethyl)-phenyl]-benzotriazole, 2-[3'-tert-butyl-2'-hydroxy-5'-(1-hydroxycarbonyl-2-ethyl)-phenyl]-5-chlorobenzotriazole, 2-(3',5'-di-tert-butyl-2'-hydroxyphenyl) benzotriazole, 2-(5'-tert-butyl-2'-hydroxyphenyl) benzotriazole, 2-(2'-hydroxy-5'-(1,1,3,3-tetramethylbutyl)phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)-benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotrazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]-benzotriazole with polyethylene glycol 300; [R—$CH_2CH_2$—COO—$CH_2CH$]$_2$, wherein R represents 3'-tert-butyl-4'-hydroxy-5'-2H-benzotriazol-2-yl-phenyl; 2-[2'-hydroxy-3'-(α,α-dimethylbenzyl)-5'-(1,1,3,3-tetramethylbutyl)phenyl] benzotriazole and 2-[2'-hydroxy-3'-(1,1,3,3-tetramethylbutyl)-5'-(α,α-dimethylbenzyl)phenyl] benzotriazole.

Specific 2-hydroxybenzophenones are, for example, the 4-hydroxy, 4-methoxy, 4-octyloxy, 4-decyloxy, 4-dodecyloxy, 4-benzyloxy, 2,4-dihydroxy, 4,2',4'-trihydroxy and 2'-hydroxy-4,4'-dimethoxy derivatives.

Specific benzoic acid esters are, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Specific oxanilides are, for example, 2-ethyl-2'-hydroxyoxanilide, 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy- and of o- and p-ethoxy-disubstituted oxanilides.

Specific 2-(2-hydroxyphenyl)-1,3,5-triazines are, for example, 2,4-bis(biphenyl-4-yl)-6-(2,6-dihydroxy)-1,3,5-triazine, 2-(2,4-dihydroxyphenyl)-4,6-diphenyl-1,3,5-triazine, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4dihydroxyphenyl)-4,6-bis(2,4-dimethylphenyl)-1,3,5-triazine, 2,4-bis(2-hydroxy-4-propoxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-n-butoxypropoxy)phenyl]-4,6-bis(2,4-dimethylphenyl)-1,3,5-triazine, 2-[2-hydroxy-4-(2-hydroxy-3-octyloxypropoxy)-phenyl]4,6-bis(2,4-dimethylphenyl)-1,3,5-triazine, 2-(4-(dodecyloxy/tridecyloxy-2-hydroxy-propoxy)-2-hydroxyphenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4methoxyphenyl)-6-phenyl-1,3,5-triazine, 2-(2-hydroxy-4-[3-(2-ethylhexyl-1-oxy)-2-hydroxypropoxy]phenyl}-4,6-bis(2,4dimethylphenyl)-1,3,5-triazine.

Particularly preferred are UV-light absorbers selected from the group consisting of (2,4-dihydroxyphenyl)-phenylmethanone, 2-benzotriazol-2-yl-4methylphenol, 4-benzotriazol-2-ylbenzene-1,3-diol, 3-[3-tert-butyl-5-(5-chlorobenzotriazol-2-yl)-4-hydroxyphenyl]-propionic acid, 3-[5-(benzotriazol-2-yl)-3-tert-butyl-4-hydroxyphenyl]propionic acid; 4-(4,6-diphenyl)-1,3,5-triazin-2-yl-benzene1,3-diol, 4-[4,6-bis (biphenyl-4-yl)-1,3,5-triazin-2-yl]-benzene-1,3-diol, 4-[4,6-di-(2,4-di-hydroxyphenyl)1,3,5-triazin2-yl]benzene-1,3-diol and N'-2-ethylphenyl-N'-2-hydroxyphenyloxalamide.

The composition may contain the above-mentioned polymer component b) in an amount of 0.1 to 99.9% by weight, preferably 0.1 to 50.0% by weight, and particularly preferably 1.0 to 30.0% by weight.

A preferred embodiment of the invention relates to a composition comprising a) 0.1-99.9% by weight dispersible inorganic or organic pigment particles; and b) 0.1-99.9% by weight dispersing agents that essentially consist of a combination of (i) a block copolymer (I), wherein X represents the fragment of a polymerisation initiator capable of initiating polymerisation of ethylenically unsaturated monomers by atom transfer radical polymerisation (ATRP) in the presence of a catalyst capable of activating controlled radical polymerisation by ATRP;

Y represents a radically transferable group, a polymerisable chain terminal group or a saturated polymer chain terminal group;

A and B represent polymer blocks composed of repeating units of ethylenically unsaturated monomers selected from the group consisting of styrenes, acrylic and methacrylic acid-$C_1$-$C_{24}$alkyl esters, acrylic and methacrylic acid-hydroxy-$C_2$-$C_6$alkyl esters, acrylic and methacrylic acid-dihydroxy-$C_3$-$C_4$alkyl esters and acrylic and methacrylic acid esters having poly-$C_2$-$C_4$alkyleneglycol ester groups, wherein the ester groups may be substituted with $C_1$-$C_{24}$alkoxy groups;

and wherein at least one of the polymer blocks A or B or the chain terminal group Y additionally contains repeating units of ethylenically unsaturated monomers substituted with basic residues which are represented by a compound of the formula

$CH_2=C(-R^1)-C(=O)-R^2$        (III), wherein $R^1$ represents hydrogen or methyl; and $R^2$ represents a basic residue selected from the group consisting of amino-$C_2$-$C_4$alkoxy, $C_1$-$C_4$alkylamino-$C_2$-$C_4$alkoxy, di-$C_1$-$C_4$alkylamino-$C_2$-$C_4$alkoxy, hydroxy-$C_2$-$C_4$alkylamino-$C_2$-$C_{18}$alkoxy and $C_1$-$C_4$alkyl-(hydroxy-$C_2$-$C_4$alkyl)-amino-$C_2$-$C_4$alkoxy;

one of x and y represents zero, one or a numeral greater than one and the other one represents a numeral greater than one;

p and q represent one; and (ii) a salt forming compound (II) selected from the group consisting of mono- or polycyclic sulphonic, mono- or polycyclic carboxylic or phosphonic acids, aliphatic sulphonic, carboxylic or phosphonic acids substituted with mono- or polycyclic groups, $C_1$-$C_8$alkyl halides substituted with mono- or polycyclic groups and $C_1$-$C_4$alkyl esters of mono- or polycyclic sulphonic acids;

provided that p-toluenesulphonic acid is excluded.

Another embodiment of the invention relates to A pigment dispersion comprising a') dispersed pigment particles; and b') a combination of a copolymer (I) wherein X, A, B, Y, x, y, p and q are as defined above; and a salt forming compound (ii) or (ii') as defined above;

and a carrier liquid, particularly water.

Another embodiment of the invention relates to the process for preparing the above-mentioned pigment dispersion, which comprises preparing the copolymer (I) by copolymerising the fragments A and B by ATRP and optionally replacing or polymerising further the chain terminal group Y; and α) modifying the copolymer with the salt forming compound, isolating and adding the modified block copolymer to dispersible pigment particles and optionally binder materials, fillers or other conventional additives; or β) modifying the copolymer with the salt forming compound in the presence of dispersible pigment particles and optionally binder materials, fillers or other conventional additives.

According to a preferred embodiment the process comprises the additional step of isolating the pigment and the modified copolymer and optional other conventional additives in a solid product-form essentially free from liquid carrier medium.

According to the process variant α) the copolymer (I) is modified by addition of the salt forming compound (ii) or (ii') defined above, and isolating the modified block copolymer (I) in pure form or as a solution or dispersion in water or an organic solvent or a mixture of both. The modified block copolymer is then added in pure form or as a solution or dispersion to dispersible pigment particles and optionally binder materials, fillers or other conventional additives.

In an alternative embodiment of the process the polymers or copolymers can be further processed and used in most cases without any further purification step. This is an important advantage when industrial scale-up is intended. According to the process variant β) the copolymer (I) is modified with the salt forming compound (ii) or (ii') in the presence of dispersible pigment particles and optionally binder materials, fillers or other conventional additives. A separate mixture of the salt forming compound (ii), dispersible pigment particles and the optional components, such as binder materials, fillers or other conventional additives, e.g. solvent, is prepared to which the copolymer (I) is added.

The sequential order of performing the individual mixing steps comprising the copolymer (I), the salt forming compound (ii) or (ii') and the optional components of the composition is non-critical according to the process of above.

The pigments are dispersed in the presence of the modified copolymer dispersant by using conventional techniques, such as high speed mixing, ball milling, sand grinding, attritor grinding or two or three roll milling. The resulting pigment dispersion may have a pigment to dispersant binder weight ratio of about 0.1:100 to 1500:100.

The organic solvents present in the dispersion are mentioned above, cf. process, and preferably are commonly used solvents in coatings technology. For water based coatings applications, aside from water, preferably polar, water-miscible solvents such as $C_1$-$C_4$alkohols, e.g. methanol, ethanol, or isopropanol, glycol ethers like butyl glycol, or methoxypropylene glycol, polyols, e.g. glycerol, or ethylene, diethylene, triethylene, triethylene or propylene glycol are used. For solvent based coating systems, preferably less polar solvents like aliphatic hydrocarbons, esters like butyl acetate, or glycol ethers like methoxypropylene glycol or glycol ether esters like methoxypropylene glycol acetate are used.

In another preferred embodiment of the process variants α) or β) fine pigment dispersions are prepared by mixing the pigments with a solution of the modified copolymers or an aqueous emulsion of the modified copolymers, concentrating the resulting mixture by distilling off the solvents and/or water, preferably to dryness, and optionally further subjecting the resulting concentrate to thermal and/or mechanical treatment to prepare a mixture comprising pigments and modified copolymers which may then be subsequently dispersed in aqueous and/or organic solvents. According to this process, the solid composition of pigment and modified copolymer is easy to disperse and does not require time and energy intensive grinding to be incorporated into e.g. a paint formulation.

The above-mentioned methods for preparing the composition, such as high speed mixing, ball milling, sand grinding, attritor grinding or two or three roll milling may in the alternative be employed when preparing the dispersion.

The present invention also relates to the use of the pigment dispersion described above for preparing coating compositions, prints, images, inks, lacquers, pigmented plastics, adhesives, casting resins, filled composites, glass fibre reinforced composites, laminates, cement based construction materials like plaster and tile adhesives.

Likewise of particular interest is a specific embodiment of the above-mentioned process for preparing the dispersion, wherein coating compositions, for example paints, are prepared. The invention therefore also relates to compositions, wherein film-forming binders for coatings are added to the composition comprising components a) and b) described above.

The novel coating composition preferably comprises 0.01-100.0 parts by weight of the combined components a) and b) in the composition, in particular 0.05-50.0 parts, especially 0.1-20.0 parts, per 100 parts by weight of solid binder.

Suitable binders are the ones customarily used, for example the ones described in *Ullmann's Encyclopedia of Industrial Chemistry, 5th Edition, Vol. A*18, pp. 368-426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also resins curable by radiation or air-drying resins can be used.

Binders that may be used are any cold- or hot-curable binders; the addition of a curing catalyst may be advantageous. Suitable catalysts that accelerate the curing of binders are described, for example, in *Ullmann's, Vol. A*18, loc. cit., p. 469.

Preference is given to coating compositions comprising a functional acrylate resin and a cross linking agent. Examples of coating compositions containing specific binders are:

Paints based on cold- or hot-cross linkable alkyd, acrylate, polyester, epoxy or melamine resins or mixtures of such resins, if desired with addition of a curing catalyst;

Two-component polyurethane paints based on hydroxyl-containing acrylate, polyester or polyether resins and aliphatic or aromatic isocyanates, isocyanurates or polyisocyanates;

One-component polyurethane paints based on blocked isocyanates, isocyanurates or polyisocyanates which are deblocked during baking, if desired with addition of a melamine resin;

One-component polyurethane paints based on a trisalkoxycarbonyl triazine cross linker and a hydroxyl group containing resin such as acrylate, polyester or polyether resins;

One-component polyurethane paints based on aliphatic or aromatic urethane acrylates or polyurethane acrylates having free amino groups within the urethane structure and melamine resins or polyether resins, if necessary with curing catalyst;

Two-component paints based on (poly)ketimines and aliphatic or aromatic isocyanates, isocyanurates or polyisocyanates;

Two-component paints based on (poly)ketimines and an unsaturated acrylate resin or a polyacetoacetate resin or a methacrylamidoglycolate methyl ester;

Two-component paints based on carboxyl- or amino-containing polyacrylates and polyepoxides;

Two-component paints based on acrylate resins containing anhydride groups and on a polyhydroxy or polyamino component;

Two-component paints based on acrylate-containing anhydrides and polyepoxides;

Two-component paints based on (poly)oxazolines and acrylate resins containing anhydride groups, or unsaturated acrylate resins, or aliphatic or aromatic isocyanates, isocyanurates or polyisocyanates;

Two-component paints based on unsaturated polyacrylates and polymalonates;

Thermoplastic polyacrylate paints based on thermoplastic acrylate resins or externally cross linking acrylate resins in combination with etherified melamine resins; and Paint systems based on siloxane-modified or fluorine-modified acrylate resins.

In addition to the components mentioned above, the coating composition according to the invention preferably comprises a light stabiliser of the sterically hindered amine type, the 2-(2-hydroxyphenyl)-1,3,5-triazine and/or the 2-hydroxyphenyl-2H-benzotriazole types. Further examples for light stabilisers of the 2-(2-hydroxyphenyl)-1,3,5-triazine type advantageously to be added can be found e.g. in the published patent literature, e.g. U.S. Pat. No. 4,619,956, EP-A-434 608, U.S. Pat. Nos. 5,198,498, 5,322,868, 5,369,140, 5,298,067, WO-94/18278, EP-A-704 437, GB-A-2297091, WO-96/28431. Of special technical interest is the addition of the 2-(2-hydroxyphenyl)-1,3,5-triazines and/or 2-hydroxyphenyl-2H-benzotriazoles, especially the 2-(2-hydroxyphenyl)-1,3,5-triazines.

Apart from the components mentioned above, the coating composition can also comprise further components, examples being solvents, pigments, dyes, plasticisers, stabilisers, thixotropic agents, drying catalysts and/or levelling agents. Examples of possible components are those described in *Ullmann's, Vol. A*18, pp. 429-471.

Possible drying catalysts or curing catalysts are, for example, organometallic compounds, amines, amino-containing resins and/or phosphines. Examples of organometallic compounds are metal carboxylates, especially those of the metals Pb, Mn, Co, Zn, Zr or Cu, or metal chelates, especially those of the metals Al, Ti or Zr, or organometallic compounds, such as organotin compounds.

Examples of metal carboxylates are stearates of Pb, Mn or Zn, octanoates of Co, Zn or Cu, naphthenoates of Mn and Co or the corresponding linoleates, resinates or tallates.

Examples of metal chelates are aluminium, titanium or zirconium chelates of acetylacetone, ethyl acetylacetate, salicylaldehyde, salicylaldoxime, o-hydroxyacetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tri-n-butylamine, triethanolamine, N-methyldiethanolamine, N-dimethylethanolamine, N-ethylmorpholine, N-methylmorpholine or diazabicyclooctane(triethylenediamine) and salts thereof. Further examples are quaternary ammonium salts, for example trimethylbenzyl ammonium chloride.

Amino-containing resins function simultaneously as binder and curing catalyst. Examples thereof are amino-containing acrylate copolymers.

The curing catalyst used can also be a phosphine, for example triphenylphosphine.

The novel coating compositions include radiation-curable coating compositions. In this case, the binder essentially comprises monomeric or oligomeric compounds containing ethylenically unsaturated bonds, which after application are cured by actinic radiation, i.e. converted into a crosslinked, high molecular weight form. Where the system is UV-curing, it generally contains a photoinitiator as well. Corresponding systems are described in the above-mentioned publication *Ullmann's, Vol. A*18, pp. 451-453. In radiation-curable coating compositions, the novel stabilisers can also be employed without the addition of sterically hindered amines.

The coating compositions according to the invention can be applied to any desired substrates, for example to metal, wood, plastic or ceramic materials. They are preferably used as base coats in the finishing of automobiles. If the topcoat comprises two layers, of which the lower layer is pigmented and the upper layer is not pigmented, the novel compositions can be used preferably for the lower layer.

The novel coating compositions can be applied to the substrates by the customary methods, for example by brushing, spraying, pouring, dipping or electrophoresis; see also *Ullmann's, Vol. A*18, pp. 491-500.

Depending on the binder system, the coatings can be cured at room temperature or by heating. The coatings are preferably cured at 50-150° C., and in the case of powder coatings or coil coatings even at higher temperatures.

The coating compositions can comprise an organic solvent or solvent mixture in which the binder is soluble. The coating composition can otherwise be an aqueous solution or dispersion. The vehicle can also be a mixture of organic solvent and water. The coating composition may be high-solids paint or can be solvent-free (e.g. a powder coating material). Powder coatings are, for example, those described in *Ullmann's, A*18, pp. 438-444. The powder coating material may also have the form of a powder-slurry (dispersion of the powder preferably in water).

The above-mentioned coating compositions or disperse systems may additionally contain fillers, such as calcium carbonate, silicates, glass fibers, glass beads, talc, kaolin, mica, barium sulphate, metal oxides and hydroxides, carbon black, graphite, wood powders, powders and fibres of other natural products, synthetic fibres, plasticisers, lubricants, emulsifiers, pigments, rheology additives, catalysts, flow auxiliaries, optical brighteners, flame retardants, or antistatic or blowing agents.

The following examples illustrate the invention.

EXAMPLES

| Abbreviations | |
|---|---|
| PMDETA | N,N,N',N'',N''-Pentamethyldiethylenetriamine |
| MBP | Methyl-2-bromopropionate |

| -continued | |
|---|---|
| Abbreviations | |
| GPC | Gel permeation chromatography |
| Calc | calculated |
| PDI | Polydispersity index |
| M | Monomer |
| MI | Macroinitiator |
| L | Ligand former |
| Me$_6$TREN | N,N-Dimethyl-N',N'-bis(2-dimethylaminoethyl)-ethylenediamine[1] |
| TREN | tris(2-Aminoethyl)-amine |
| RT | Room temperature |
| h | Hour(s) |
| BA | n-Butyl acrylate |
| DMAEA | 2-Dimethylaminoethyl acrylate |
| DMAEMA | 2-Dimethylaminoethyl methacrylate |
| DBU | 1,8-Diazabicyclo[2.2.2]undec-7-ene |
| PTSA | p-Toluenesulphonic acid |
| AIBN | Azoisobutyronitrile |
| CAB | Cetyl ammonium bromide |

[1]Synthesised by methylation of TREN with formaldehyde according to Beilstein E IV, Vol. 4, p. 1251; El. anal. calc C: 62.55%, H: 13.12%, N: 24.32%; found C: 62.22%, H: 13.29%, N: 24.54%.

1 Dispersions and Pigmented Coatings Containing Block Copolymers or Comb Polymers Prepared by ATRP 1.1 Preparation of Polymers 1.1.1 Poly-n-butylacrylate with Terminal Br-groups by the ATRP Method without the Addition of Solvent ([M]:[I]:[CuBr]:[L]=110:1:0.6:0.6).

600.00 g (4.68 mol) BA (BASF, techn. quality) and 3.65 g (25.5 mmol) CuBr (Fluka, purified by treatment with acetic acid) are added to a 1500 ml round flask equipped with a mechanical stirrer. The air is removed from the flask by stirring and evacuating and rinsing with nitrogen 3 times. 4.42 g (5.3 ml, 25.5 mmol) PMDETA are added through the rubber sealing with a syringe. The mixture is homogenised by stirring, evacuated again and rinsed with nitrogen 3 times. After addition of 7.10 g (4.7 ml, 42.5 mmol) MBP (initator) with a syringe and heating up to 90° C. in the oil bath the exothermal polymerisation reaction is started. The temperature rises quickly and is controlled at a level of 100-105° C. (ice bath). The mixture is polymerised for 2 h. After this time the conversion of the monomer reaches 90%, as determined by $^1$H-NMR-analysis (CDCl$_3$). The reaction mixture is cooled to room temperature and 500 ml ethyl acetate and 440 g neutral aluminum oxide (Alox® for chromatography, Merck) are added in 2 portions. After stirring the mixture for 1 h at room temperature, filtration and drying in the rotary evaporator at 80° C. and additional drying with a vacuum pump, 489.9 g (90%) of a viscous polymer is obtained.

GPC (THF, PS-standards): M$_n$: 13780, M$_w$: 15640, PDI: 1.13 (M$_n$(calc): 12670);

Elementary Analysis:

| | C | H | Br |
|---|---|---|---|
| Calc | 65.11 | 9.98 | 0.62 |
| Found | 65.14 | 9.39 | 0.48 |

1.1.2 Block Copolymer of n-butyl Acrylate and DMAEA by ATRP ([M]:[I]:[CuBr]:[L]=14.4:1:0.5:0.5)

120.00 g poly-n-butyl acrylate, prepared as described above (1.1.1) and 0.62 g (4.35 mmol) CuBr (Fluka, purified by treatment with acetic acid) are added to a 350 ml round flask equipped with a mechanical stirrer. The air is removed from the flask by stirring, evacuating and rinsing 3 times with nitrogen. The mixture is stirred and 17.95 g (19.2 ml, 125 mmol) DMAEA (BASF, technical quality) and 1.0 g (1.18 ml, 4.35 mmol) Me$_6$TREN are added through the rubber sealing with a syringe. The mixture is made homogeneous by stirring, and the slightly exothermal polymerisation reaction is started at RT. The mixture is subjected to polymerisation for 4 h and the conversion is determined by $^1$H-NMR-analysis in CDCl$_3$ (90%). After cooling to room temperature, 120 ml ethyl acetate and 25 g ALOX are added. The purified polymer is obtained after stirring for 1 h at room temperature, filtration and drying in the rotary evaporator at 80° C., followed by drying in the vacuum pump. 139.8 g (98%) of a viscous polymer are obtained.

GPC (THF/PS standards): M$_n$: 15480 (calc: 15640), M$_w$: 18700; PDI: 1.21;

Elementary Analysis

|  | C | H | N | Br |
|---|---|---|---|---|
| Calc | 64.31 | 9.34 | 1.24 | 0.54 |
| Found | 65.14 | 9.52 | 1.16 | 0.18 |

The pure viscous block copolymer 1.1.2 is dissolved in butyl acetate at 80% solids to give a clear solution and is used in the preparation of pigment dispersions.

1.1.3 Block Copolymer P(BA-b-DMAEA) which is Modified with PTSA

Analogous to 1.1.2 a block copolymer of BA and DMAEA is prepared by ATRP.

GPC (THF, PS-standards): M$_n$: 7050, M$_w$: 8670, PDI: 1.23 (M$_n$(calc): 7340);

$^1$H-NMR (CDCl$_3$): 80 mol % BA, 20 mol % DMAEA (taking into account the GPC results of the PBA-precursor): ~42.5 units of BA and 12 units of DMAEA).

Elementary Analysis:

|  | C | H | N | Br |
|---|---|---|---|---|
| Calc | 63.31 | 9.28 | 2.44 | 1.14 |
| Found | 63.63 | 9.31 | 2.07 | 0.49 |

80 g of the above-mentioned block-copolymer (containing 118 mmol N) is diluted with 39.1 ml butyl acetate solution and stirred at room temperature in a 350 ml round flask equipped with a mechanical stirrer. 11.26 g (59.2 mmol, corresponding to 50% neutralisation of the amines) PTSA (Fluka, purum), dissolved in 30 ml hot n-butyl acetate (Fluka, purum) is slowly added and the reaction mixture stirred during 1 h. 144 g of a slightly yellow-orange viscous solution is obtained. The solution of the modified copoymer 1.1.3 with solids content of 60% is used without further purification.

Analysis of the Modified Copolymer:

GPC (DMF, PS-standards): M$_n$: 9590, M$_w$: 11500, PDI: 1.20 (M$_n$(calc): 8200).

1.1.4 Poly-n-butylacrylate Macromonomer (M$_n$: 13530) with Terminal Methacrylate Group 1282 g (10.0 mol) n-butylacrylate (BASF, techn.) and 9.7 g (68 mmol) CuBr (Fluka, purified by treatment with acetic acid) are added to a 2500 ml round flask equipped with a mechanical stirrer. The air is removed from the flask by stirring and evacuating and rinsing with nitrogen 3 times. 21.4 g (137 mmol) of the ligand precursor 2,2'-Bipyridyl (Fluka, puriss p.a.), dissolved in 143 ml DMF (Fluka, puriss p.a.) are added under nitrogen. The mixture is evacuated and rinsed with nitrogen 3 times and homogenised by stirring at 50° C. After the addition of 15.2 g (10.1 ml, 91 mmol) MBP (initiator, Fluka purum) with a syringe and heating up to 110° C. in the oil bath the exothermal polymerisation reaction is started. The temperature rises quickly and is controlled at a level of 110-116° C. (ice bath). The mixture is polymerised for 4 h. After this time the conversion of the monomer reaches 90%, determined by $^1$H-NMR-analysis in CDCl$_3$. The mixture is cooled to 80° C. and 400 ml ethyl acetate is added. After cooling to room temperature and stirring for 1 h the mixture is filtered to remove the Cu-complex. The filtered solution is directly used for the methacrylate functionalisation: 9.38 g (9.24 ml, 109 mmol) methacrylic acid (Fluka, purum) is added, followed by 16.59 g (109 mmol) DBU (Fluka, purum) and the mixture stirred for 20 h at room temperature. The mixture is filtered, stirred with 200 g silicagel and filtered again to remove all of the DBU-hydrobromide formed. The final macromonomer is obtained after drying in the rotary evaporator at 100° C. with a vacuum pump. 1130.3 g of a yellow, viscous polymer is obtained (97%, taking into account the 90% polymer conversion).

GPC (THF, PS-standards): M$_n$: 13530, M$_w$: 16900, PDI: 1.25;

Elementary Analysis:

|  | C | H | Br |
|---|---|---|---|
| Calc | 65.47 | 9.41 | 0.0 |
| Found | 65.73 | 9.04 | <0.3 |

Titration of double bonds: Calculated: 0.074 meq/g, found: 0.086 meq/g.

1.1.5 Comb Copolymer by Copolymerisation of Poly-n-butylacrylate Macromonomer of Example 1.1.4 with DMAEMA 230 g (17 mmol) of the macromonomer 1.1.4, 64.87 g (413 mmol) DMAEMA (Aldrich, 98%), 220.3 ml butyl acetate (Fluka, purum) and 5.90 g (35.9 mmol) AIBN (Fluka, purum) are mixed in a 1500 ml round flask equipped with a mechanical stirrer. The air is removed from the flask by stirring, evacuating and rinsing with nitrogen 3 times. The mixture is heated on an oil bath to 80° C. and polymerised for 4 h. The conversion of monomers, determined by $^1$H-NMR-analysis in CDCl$_3$, is almost quantitative. After cooling to room temperature 484.2 g of a transparent, slightly yellow, viscous polymer solution is obtained with 63.6% solid content. This solution of the copolymer 1.1.5 is used without further purification.

GPC (THF, PS-standards): M$_n$: 21600, M$_w$: 46600, PDI: 2.16;

Elementary Analysis:

|  | C | H | N |
|---|---|---|---|
| Calc | 64.52 | 9.45 | 2.07 |
| Found | 64.26 | 9.03 | 2.14 |

1.1.6 Comb Copolymer Modified by Neutralisation of 50 mol % of the Amino Groups in the Copolymer 1.1.5 with PTSA 78.65 g of the copolymer solution according to 1.1.5 (corresponding to 50 g pure graft copolymer) is stirred at 80° C. in a 350 ml round flask equipped with a mechanical stirrer. 7.28 g (38.3 mmol, 0.5 equ.) PTSA (Fluka, purum), dissolved in 32.5 ml hot butyl acetate (Fluka, purum), is slowly added. The reaction mixture is stirred for 2 h. After cooling to room temperature, the yellow viscous solution of the comb copolymer 1.1.6 with a solids content of 50% is used without further purification.

1.1.7 Poly-n-butylacrylate Macromonomer of Molecular Weight $M_n$: 6930 with Terminal Methacrylate Group 1000 g (7.8 mol) BA (BASF, techn.), 6.71 g (46.8 mmol) Cu(I)Br (Fluka, purified by treatment with acetic acid), 1.16 g (5.2 mmol) Cu(II)Br$_2$ (Fluka, puriss p.a.) and 275 ml acetone (Fluka puriss p.a.) are added to a 2500 ml round flask equipped with a mechanical stirrer. The air is removed from the flask by stirring, evacuating and rinsing with nitrogen 3 times. 9.01 g (10.9 ml, 52 mmol) PMDETA (Fluka, purum) are added through the rubber sealing with a syringe. The mixture is homogenised by stirring, evacuated and rinsed again with nitrogen 3 times. After the addition of 21.71 g (14.5 ml, 130 mmol) MBP (initiator) with a syringe and heating up to 60° C. in the oil bath the slightly exothermal polymerisation reaction is started. The temperature rises to 65° C. and is controlled at a level of 60-65° C. (ice bath). The mixture is polymerised for 6 h. After this time the conversion of the monomer reaches 75%, as determined by 1H-NMR-analysis in CDCl$_3$. The mixture is cooled to room temperature and 200 ml ethyl acetate and 200 g neutral ALOX (for chromatography, Merck) are added. The mixture is stirred for 1 h at room temperature and filtrated. The filtered solution is directly used for the methacrylate functionalisation: 13.43 g (13.2 ml, 156 mmol) Methacrylic acid (Fluka, purum) is added followed by 23.75 g (156 mmol) DBU (Fluka, purum). The mixture is stirred for 20 h at room temperature, filtered, stirred with 200 g silicagel and filtered again to remove all of the DBU-hydrobromide formed. The macromonomer is obtained after drying for 1 h in the rotary evaporator at 90° C. 763 g (99%, taking into account the 90% polymer conversion) of a yellow, viscous polymer is obtained.

GPC (THF, PS-standards): $M_n$: 6930, $M_w$: 7650, PDI: 1.10;

Elementary Analysis:

|  | C | H | Br |
|---|---|---|---|
| Calc | 65.35 | 9.38 | 0.0 |
| Found | 64.91 | 9.31 | <0.3 |

Titration of double bonds: calc: 0.140 meq./g, found: 0.144 meq./g.

1.1.8 Comb Copolymer by Copolymerisation of Poly-n-buylacrylate Macromonomer 1.1.7 with DMAEMA 230 9 (33.2 mmol) macromonomer 1.1.7, 68.7 g (437 mmol) DMAEMA (Aldrich, 98%), 230 ml butyl acetate (Fluka, purum) and 5.97 g (36.4 mmol) AIBN (Fluka, purum) are mixed in a 1500 ml round flask equipped with a mechanical stirrer. The air is removed from the flask by stirring, evacuating and rinsing with nitrogen 3 times. The mixture is heated on an oil bath to 80° C. and polymerised for 4 h. The conversion of monomers, determined by $^1$H-NMR-analysis in CDCl$_3$, is almost quantitative. After cooling to room temperature, 494 g of a transparent, slightly yellow, viscous polymer solution is obtained with 62.5% solid content. This solution of copolymer 1.1.8 is used without further purification.

GPC (THF, PS-standards): $M_n$: 18000, $M_w$: 52700, PDI: 2.92;

Elementary Analysis:

|  | C | H | N |
|---|---|---|---|
| Calc | 64.42 | 9.43 | 2.20 |
| Found | 63.55 | 9.04 | 2.09 |

1.2 Modifying Agents Used as Salt Forming Compounds According to the Process Variants α) or β)

1.2.1 3-(2H-Benzotriazol-2-yl)-5-sec-butyl-4-hydroxybenzenesulphonic acid:

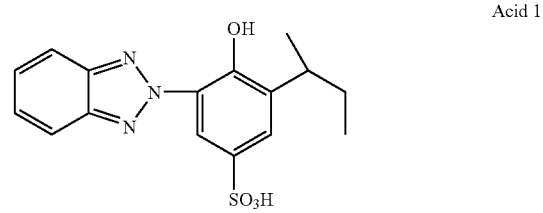

Acid 1

1.2.2 Uvinul® MS40:

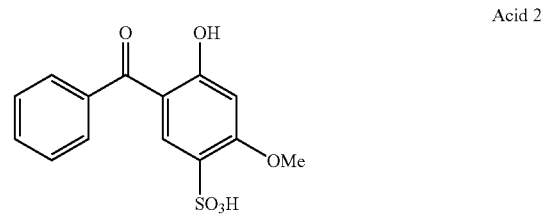

Acid 2

1.2.3 1-(Benzothiazol-2-ylthio)-succinic acid:

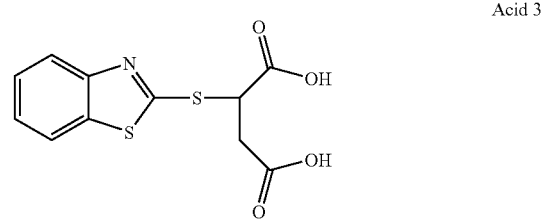

Acid 3

1.3 Preparation and Testing of Pigment Dispersions Containing Modified Block Copolymers or Modified Comb Polymers The performance of the different ATRP copolymers modified with the different salt forming compounds is evaluated in millbase preparations and corresponding coating formulations made therefrom.

1.3.1 Preparation and Testing of the Millbase:

A polyester millbase formulation is prepared according to the following prescription:

| | |
|---|---|
| Dynapol ® H700-08 | 11.99 g |
| Pigment | 9.60 g |
| Dispersant (60% active) | 3.20 g |
| Xylene/Butylacetate 40/60 | 55.21 g |
| Total | 80.00 g |

Dependent on the active content of the different dispersants used and the optional addition of acids, the formulation is slightly adjusted by solvents and DYNAPOL resin in order to adjust a pigment binder ratio of about 1. The components are ground for 4 h with glass beads on a shaking machine (DIN 53238-13). The viscosity of the millbase after grinding is measured at different shear rates with a cone-plate rheometer (Paar Physica UDS 200). Good dispersant efficiency can be seen by lowering of the millbase viscosity especially at mid to low shear rates, e.g. at a shear rate of 16. Two different processes for the preparation of the millbase may be used:

Process α)

The modified copolymer dispersant is prepared separately in the form of a concentrate additive solution. The additive solution is added together with the other components of the millbase and then ground for 4 hours.

Process β)

The aminic block copolymer or comb polymer and the corresponding salt forming compound are added separately to the other components of the millbase and then ground for 4 h. In this case, the modified copolymer is formed in-situ during the grinding of the millbase.

1.3.2 Preparation and Testing of a Full Shade Coating of Type Polyester/Melamine/CAB Full shade formulations with a pigment content of 5% are prepared from the polyester-millbase according to the following general prescription:

| | |
|---|---|
| Millbase | 30.00 g |
| Dynapol ® H700-08 | 12.42 g |
| CAB 531.1 | 18.97 g |
| Maprenal ® MF650 | 2.12 g |
| O/S Zirkonium 6 | 0.36 g |
| Xylene/Butylacetate 40/60 | 8.13 g |
| Total | 72.00 g |

The fullshade formulation is drawn down on a glass plate, dried at room temperature and cured at 130° C. for 30 min. Gloss measurements are made on the cured coatings. High gloss indicates a good dispersion of the pigment in the final coating.

2 Results

The following Table shows the composition of the dispersants and the results of application tests in a typical millbase formulation and a fullshade coating formulation made therefrom. The formulations containing modified copolymers of the invention are compared to reference formulations containing other pigment dispersants made by controlled free radical polymerisation. Application results are based on the commercial pigment Iragazin® DPP Rubine TR in a coating system polyester/melamine/CAB. The results demonstrate that the dispersants modified with the different salt forming compounds of the invention possess superior rheology of the millbase and/or improved gloss of the full shade coating.

TABLE

Application Results with IRGAZINE RUBINE TR in Coating System Polyester/Melamine/CAB

| Dispersant No. | Dispersant Composition[1] | Polymer Tested | Molecular Weight GPC[2] | Modifying Agent | Process Type/ theor. Degree of Neutralisation | Millbase % Copolymer[3] | Millbase % Modifier[4] | Viscosity Millbase at Shear Rate: 1 | 16 | 128 | 1024 | Full Shade Coating Gloss 20° |
|---|---|---|---|---|---|---|---|---|---|---|---|---|
| 1[6] | P(BA-b-DMAEMA) 87 - 13 | Polymer 1.1.2 | Mw = 18700 Mn = 15480 PD = 1.21 | — | α | 20.0 | — | 13000 | 4170 | 698 | 116 | 37 |
| 2[6] | P(BA-b-DMAEA) 78 - 22 | Polymer 1.1.3 | Mw = 8670 Mn = 7050 PD = 1.23 | pTSA | | 17.7 | 2.3 | 23100 | 3540 | 547 | 96 | 55 |
| 3[6] | P(BA-b-DMAEMA) 87 - 13 | Polymer 1.1.2 | Mw = 18700 Mn = 15480 PD = 1.21 | Acid 1 | β ≈ 34% | 16.0 | 4.0 | 6340 | 764 | 141 | 36 | 67 |
| 4[6] | P(BA-b-DMAEA) 87 - 3 | Polymer 1.1.2 | Mw = 18700 Mn = 15480 PD = 1.21 | Acid 1 | β ≈ 76% | 13.0 | 7.0 | 7650 | 815 | 159 | 38 | 76 |
| 5[6] | P(BA-b-DMAEA) 87 - 13 | Polymer 1.1.2 | Mw = 18700 Mn = 15480 PD = 1.21 | Acid 2 | β ≈ 40% | 16.0 | 4.0 | 17800 | 3040 | 468 | 85 | 74 |
| 6[6] | P(BA-b-DMAEA) 87 - 13 | Polymer 1.1.2 | Mw = 18700 Mn = 15480 PD = 1.21 | Acid 2 | β ≈ 89% | 13.0 | 7.0 | 18600 | 2180 | 337 | 64 | 70 |
| 7[6] | P(BA-b-DMAEA) 87 - 13 | Polymer 1.1.2 | Mw = 18700 Mn = 15480 PD = 1.21 | Acid 3 | β ≈ 50% | 18.8 | 1.2 | 16700 | 2220 | 353 | 69 | 78 |
| 8[6] | P(BA-b-DMAEA) 87 - 13 | Polymer 1.1.2 | Mw = 18700 Mn = 15480 PD = 1.21 | Acid 3 | β ≈ 100% | 17.7 | 2.3 | 14500 | 1850 | 309 | 64 | 79 |

TABLE-continued

Application Results with IRGAZINE RUBINE TR in Coating System Polyester/Melamine/CAB

| | | | Dispersant | | Process Type/ | Millbase % Copoly- | Millbase % Modi- | Viscosity Millbase at Shear Rate: | | | | Full Shade Coating |
|---|---|---|---|---|---|---|---|---|---|---|---|---|
| No. | Dispersant Composition[1] | Polymer Tested | Molecular Weight GPC[2] | Modifying Agent | theor. Degree of Neutralisation | mer[3] | fier[4] | 1 | 16 | 128 | 1024 | Gloss 20° |
| 9[5] | P(BA-g-DMAEMA) 78 - 22 | Polymer 1.1.6 | Mw = 46600 Mn = 21600 PD = 2.16 | PTSA | α | 17.5 | 2.5 | 33200 | 4020 | 607 | 111 | 59 |
| 10[6] | P(BA-g-DMAEMA) 78 - 22 | Polymer 1.1.5 | Mw = 46600 Mn = 21600 PD = 2.16 | Acid 3 | β ≈ 100% | 16.6 | 3.4 | 25800 | 2970 | 455 | 87 | 66 |
| 11[6] | P(BA-g-DMAEMA) 77 - 23 | Polymer 1.1.8 | Mw = 52700 Mn = 18000 PD = 2.92 | Acid 3 | β ≈ 100% | 16.5 | 3.5 | 20200 | 2710 | 420 | 77 | 69 |

[1] Monomer composition given in wt %; BA = butyl acrylate, DMAEMA = dimethylaminoethyl methacrylate, DMAEA = dimethylaminoethyl acrylate;
[2] Molecular weights determined with the non-modified block copolymers;
[3] Concentration of block copolymer is relative to the pigment;
[4] Concentration of modifier is relative to the pigment;
[5] Comparative Examples;
[6] Modified Block Copolymers

The invention claimed is:

1. A composition comprising
a) 0.1-99.9% by weight dispersible inorganic or organic pigment particles; and
b) 0.1-99.9% by weight dispersing agents that essentially consist of a combination of
(i) polymer of the formula $$\{X-[(A_x\text{-}B_y)]_p\text{—}Y\}_q \quad (I),$$

wherein
X represents the fragment of a polymerisation initiator capable of initiating polymerisation of ethylenically unsaturated monomers by atom transfer radical polymerisation (ATRP) in the presence of a catalyst capable of activating controlled radical polymerisation by ATRP;
Y represents a polymer chain terminal group, a polymerisable chain terminal group or a saturated polymer chain terminal group;
A and B are represent polymer blocks composed of repeating units of ethylenically unsaturated monomers selected from the group consisting of styrenes, acrylic and methacrylic acid-$C_1$-$C_{24}$alkyl esters, acrylic and methacrylic acid-hydroxy-$C_2$-$C_6$alkyl esters, acrylic and methacrylic acid-dihydroxy-$C_3$-$C_4$alkyl esters and acrylic and methacrylic acid esters having poly-$C_2$-$C_4$alkyleneglycol ester groups, wherein the ester groups may be substituted with $C_1$-$C_{24}$alkoxy groups;
and wherein at least one of the polymer blocks A or B or the chain terminal group Y additional contains repeating units of ethylenically unsaturated monomers substituted with basic residues which are representing by a compound of the formula $$CH_2\text{=}C(\text{—}R^1)\text{—}C(\text{=}O)\text{—}R^2 \quad (III),$$

wherein
$R^1$ represents hydrogen or methyl; and
$R^2$ represents a basic residue selected from the group consisting of amino-$C_2$-$C_4$alkoxy, $C_1$-$C_4$alkylamino-$C_2$-$C_4$alkoxy, di-$C_1$-$C_4$alkylamino-$C_2$-$C_4$alkoxy, hydroxyl-$C_2$-$C_4$alkylamino-$C_2$-$C_{18}$alkoxy and $C_1$-$C_4$alkyl-(hydroxyl-$C_2$-$C_4$alkyl)amino-$C_2$-$C_4$alkoxy;
one of x and y represents zero, one or a numeral greater that one and the other one represents a numeral greater than one;
p and q are 1; and
(ii) a salt forming compound selected from the group consisting of monocyclic or polycyclic sulphonic, mono- or polycyclic carboxylic or phosphonic acids, aliphatic sulphonic, carboxylic or phosphonic acids substituted with mono- or polycyclic groups, $C_1$-$C_8$alkyl halides substituted with polycyclic groups, 2-chlorobenzylchloride, 4-chlorobenzylchloride, 2,4-dichlorobenzylchloride and $C_1$-$C_4$alkyl esters of mono- or polycyclic sulphonic acids;
with the proviso that p-toluenesulphonic acid is excluded as salt-forming component (ii).

2. A composition according to claim 1, wherein the dispersible organic pigments or pearlescent flakes of component a) are selected from the azo pigment group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, anthrapyrimidines, indanthrones, flavanthrones, pyranthrones, anthantrones, isoviolanthrones, diketopyrrolopyrrole, and carbazoles.

3. A composition according to claim 1, wherein the dispersible inorganic pigment particles of component a) are selected from the group consisting of aluminum, aluminum oxide, silicon oxide and silicates, iron(III)oxide, chromium (III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, chromates, and molybdates, and mixtures, crystal forms or modifications thereof.

4. A composition according to claim 1, wherein
X represents a polymer chain terminal group from a polymerisation initiator which is selected from the group consisting of $C_1$-$C_8$alkyl halides, $C_6$-$C_{15}$aralkyl halides, $C_2$-$C_8$haloalkyl esters, arene sulphonyl halides, α-haloalkanenitriles, α-haloacrylates and halolactones;

Y represents a radically transferable group, hydrogen or a polymerisable chain terminal group and p and q represent one.

5. A composition according to claim 1, which additionally contains binding agents and conventional additives selected from the group consisting of surfactants, light stabilisers, UV-absorbers, anti-foaming agents, antioxidants, dyes, plasticisers, thixotropic agents, drying catalysts, anti-skinning agents and leveling agents.

6. A pigment dispersion comprising a composition according to claim 1 and a solvent.

7. A process for preparing the pigment dispersion according to claim 6, which comprises preparing the polymer (I) by polymerising fragments A and B by ATRP and optionally replacing or polymerising the chain terminal group Y; and α) modifying the copolymer with the salt forming compound, isolating and adding the modified block copolymer to dispersible pigment particles and optionally binder materials, fillers or other conventional additives; or β) modifying the copolymer with the salt forming compound in the presence of dispersible pigment particles and optionally binder materials, fillers or other conventional additives.

8. A process according to claim 7 comprising the additional step of isolating the pigment and the modified copolymer and optional other conventional additives in a solid product form.

9. Coating compositions, prints, images, inks, lacquers, pigmented plastics, adhesives, casting resins, filled composites, glass fiber reinforced composites, laminates, cement based construction materials containing the pigment dispersion according to claim 6.

10. A composition according to claim 1, wherein the salt forming group ii) is selected from the group consisting of monocyclic or polycyclic sulphonic, mono- or polycyclic carboxylic or phosphonic acids, aliphatic sulphonic, carboxylic or phosphonic acids substituted with mono- or polycyclic groups and $C_1$-$C_4$alkyl esters of mono- or polycyclic sulphonic acids.

11. A composition according to claim 10, wherein the salt forming group ii) is an acid selected from the group consisting of 3-nitrobenzene sulphonic acid, 4-sulphonphthalic acid, 4-chlorobenzene sulphonic acid, 4-hydroxy-3-nitrobenzene sulphonic acid, 4-acetylbenzenesulphonic acid, 2,5-dihydroxybenzenesulphonic acid, sulphanilic acid, 4-succinimidobenzenesulphonic acid, benzene-1,3-disulphonic acid, 4-phthalimidobenzenesulphonic acid, 3-sulphobenzoic acid, 8-hydroxyquinoline sulphonic acid, (+−)camphor-10-sulphonic acid, 2-naphthylamine-1-sulphonic acid, naphthalene-2-sulphonic acid, naphthalene 1,3,6-trisulphonic acid, isomeric mixtures of naphthalene-trisulphonic acid, naphthalene-1-sulphonic acid, 2-naphthylamine-6,8-disulphonic acid, naphthalene 1,5-disulphonic acid, pyridine-3-sulphonic acid, 7-amino-1-naphthol-3-sulphonic acid, phthalic acid trimellitic acid anhydride, isophthalic acid, 5-nitro-isophthalic acid, 4-nitrobenzoic acid-, benzoic acid-4-sulphamide, 3,5-dinitrobenzoic acid, 1-naphthylacetic acid, 2-chlorobenzoic acid, 3-hydroxynaphthoic acid, 2,4-dichlorobenzoic acid, N-(4-carboxyphenyl) phthalimide, 4-phenylbenzoic acid, 1-naphthoic acid, phthaloyl glycine, 3,4,5-trimethoxybenzoic acid, 3-(2, 4-dichlorophenoxy)butyric acid, 2,4-dichlorophenoxyacetic acid, 3-oxo-3-(2,4-dichlorophenyl)butyric acid, theophyline-7-acetic acid, 2-phthalimidobenzoic acid, 2-phthalimidopropanoic acid, 3-(4,5-dichlorophthaloylimido)benzoic acid, 2-phthaloylimidosuccinic acid, nicotinic acid, 2-(3,4,5,6-tetrachlorophthaloylimido) benzoic acid, 3-pyridinepropionic acid, nicotinic acid N-oxide, quinolinic acid, pyridine-2,5-dicarboxylic acid, 2-phthalimidobutyric acid, 2-phthalimidopropionic acid, 4-methyl-2-phthalimidovaleric acid, 2-phthalimidoisovaleric acid, 2-phthalimidoglutaric acid, tryptophane, 2,4,6-trichlorophenoxyacetic acid, 2(2,4-dichlorophenoxy) propionic acid, 3(2,4-dichlorobenzoyl) butyric acid, 2,4-dichlorophenylacrylic acid, 3(4, 5-dichlorophthalimido) benzoic acid, 2-tetrachlorophthalimidobenzoic acid, 3-tetrachlorophthalimidobenzoic acid, tetrachlorophthaloylglycine, histidine, 2,(2-carboxyphenylthiomethyl)succinic acid, 2-(2-benzothiazolylthio)succinic acid, 2-[2-(5-chlorobenzothiazolylthio)]succinic acid, 2-(2-benzothiazolylthio)succinic acid, 2-(2-benzimidazolylthio)succinic acid, 2-(2-aminophenylthiomethyl)succinic acid, 2-(2-benzimidazolylthio)valeric acid and 3-(2-benzothiazolylthio)propanephosphonic acid.

\* \* \* \* \*